(12) United States Patent
Richens et al.

(10) Patent No.: US 6,226,000 B1
(45) Date of Patent: May 1, 2001

(54) INTERACTIVE IMAGE EDITING

(75) Inventors: Paul Nicholas Richens, Cambridge; Simon Schofield, London, both of (GB)

(73) Assignee: Informatix Software International Limited (GB)

( * ) Notice: Subject to any disclaimer, the term of this patent is extended or adjusted under 35 U.S.C. 154(b) by 0 days.

(21) Appl. No.: 08/737,383

(22) PCT Filed: Sep. 11, 1996

(86) PCT No.: PCT/GB96/02241

§ 371 Date: Mar. 4, 1997

§ 102(e) Date: Mar. 4, 1997

(87) PCT Pub. No.: WO97/10570

PCT Pub. Date: Mar. 20, 1997

(30) Foreign Application Priority Data

Sep. 11, 1995 (GB) .................................................. 9518530

(51) Int. Cl.[7] .................................................... G06T 15/00
(52) U.S. Cl. ............................................................. 345/419
(58) Field of Search .................................. 345/418, 419, 345/420, 421, 422

(56) References Cited

U.S. PATENT DOCUMENTS

| 5,729,669 | * | 3/1998 | Appleton ............................ 345/422 |
| 5,748,863 | * | 5/1998 | Fossum ............................. 345/422 |
| 5,761,400 | * | 6/1998 | Derby et al. ...................... 345/422 |
| 5,819,017 | * | 10/1998 | Akeley et al. ..................... 345/422 |

* cited by examiner

*Primary Examiner*—Cliff N. Vo
(74) *Attorney, Agent, or Firm*—Holland & Hart LLP

(57) ABSTRACT

A 2-D image editor 23 is provided which can apply paint, texture, special effects such as fog and entourage, to a rendered 2-D image in proper perspective relative to the 3-D scene represented by the 2-D image. The image editor 23 determines the perspective on a pixel by pixel basis using a z-buffer which contains a depth value for each pixel in the 2-D image to be edited. The 2-D image may be created by a renderer 21 rendering a 3-D geometrical model output by a 3-D modelling unit 19.

71 Claims, 24 Drawing Sheets

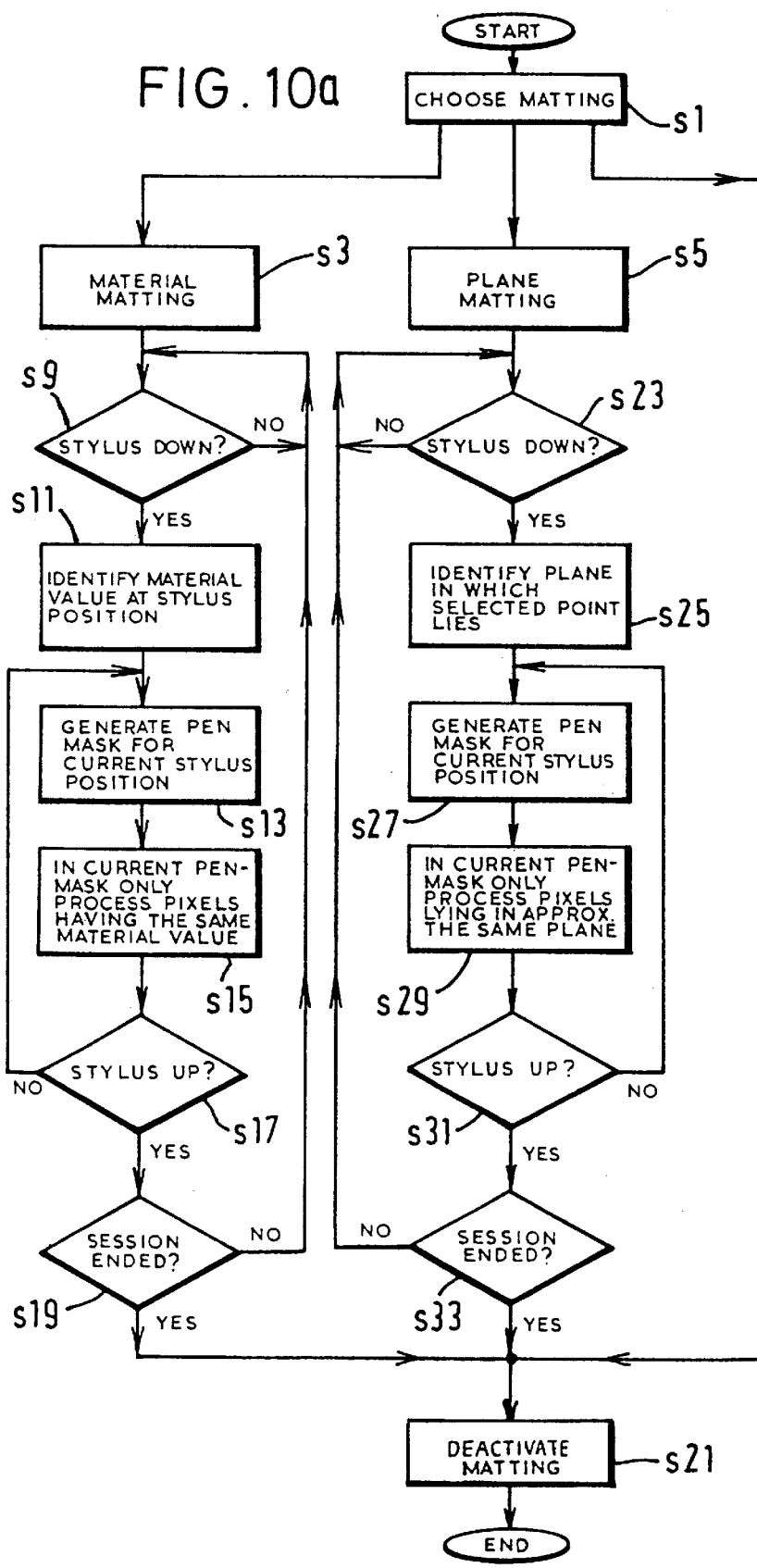

INTERACTIVE IMAGE EDITING

The present invention relates to a method of and apparatus for editing a two dimensional (2-D) raster image using a computer graphics editing package. The present invention has particular although not exclusive relevance to the editing of a rendered 2-D raster image of a 3-D scene.

In recent years, architects have increasingly used computer aided design (CAD) to generate images of buildings and structures which they design, because CAD has the potential advantage of being able to generate rapidly a number of images of the building or structure from different view points, showing correct perspective, lighting and high levels of detail, once a computer model has been created. However, the process of creating the computer model and then rendering it to create the finished image is a complex and arduous process, quite different from the classical design approach with which architects are familiar.

In particular, the architect typically must firstly create a geometrical model of the structure to form a 3-D "wire diagram". Then the architect must choose a viewpoint, lighting, surface materials, texturing and the like and feed these into a computer rendering package, which generates a 2-D raster image of the 3-D structure taken from the desired viewpoint with the desired lighting, surface materials, texturing etc. Depending upon the complexity of the 3-D model, this rendering process can take between minutes for a relatively simple model to days for a relatively complex one. Furthermore, several re-renders are usually necessary, using adjusted input parameters, before a visually acceptable rendered image is produced. This process is therefore lengthy, complex and tedious and is quite remote from the artistic creative methods of hand drawn designs.

Methods of creating images by hand, of the sort used in painting and drawing, are much more suited to the way in which artists and designers, and in particular architects, want to work because they are continuous, uninterrupted methods which provide instantaneous feedback. The final image gains clarity and conviction more from the gradual process of construction than it does from the original, isolated conception in the artist's "minds' eye". The artist is able to make localised changes to the image resulting in a richer structure than can be presently generated using a CAD system. The subtleties and nuances eventually residing in the final hand made image are such that no amount of formal description and paramaraterisation, of the sort required by conventional rendering algorithms, can produce the same results.

The nearest computer-based counterpart to the traditional approach of image making is the digital paint system, such as Photoshop available from Adobe Systems Inc., Mount View, Calif., USA. Indeed, architects and designers often edit the final computer rendered image using such a system. Unfortunately, these paint systems offer no assistance in handling the complex perspectives and tonal approximations in the image output by the rendering algorithms, and users must therefore assess these by eye alone.

One aspect of the present invention provides a computer-based image editing method and apparatus which allows interactive editing operations which are responsive to the depth of objects within the 3-D scene.

According to this aspect, a computer-based image editing apparatus or method is provided for editing a stored two dimensional (2-D) raster image of a three dimensional (3-D) scene viewed from a given viewpoint, wherein interactive editing operations of the apparatus are responsive to depth values stored for the pixels of the image, said depth values representing the distance between said viewpoint and points in the 3-D scene represented by the pixels.

Another aspect of the present invention provides a computer-based image editing method and apparatus which allows interactive rendering of a 2-D image of a 3-D scene which gives the appearance of applying paint to the object within the 3-D scene.

According to this aspect, the present invention provides a computer-based image editing apparatus for editing a two dimensional (2-D) raster image of a three dimensional (3-D) scene viewed from a given viewpoint, comprising means for storing the 2-D raster image to be edited together with depth values for the pixels in the image; designation means, responsive to an input from a user, for designating part of the 2-D image to be edited; and modifying means for modifying the designated part of the image in a manner responsive to the depth values associated with the pixels in the designated part of the image.

This aspect also provides a computer-based method of editing a two dimensional (2-D) raster image of a three dimensional (3-D) scene viewed from a given viewpoint, comprising the steps of designating a portion of the 2-D image to be edited and modifying the designated portion of the image so as to apply a user selected editing effect in a manner dependent upon depth values for the pixels in the designated portion.

The paint applied to the 3-D scene may be textured, thereby allowing the user to paint texture on to surfaces within the 3-D scene.

To aid in the painting operation, the image editing system of this aspect allows the user to select a plane within the 3-D scene to be painted; to select the material (e.g. sky, ground, brick etc.) of an object within the 3-D scene to be painted; and/or to select a surface of an object in the 3-D scene for painting. This feature provides a significant advantage over prior art type selection tools used in image editors, which require the user to draw a polygon around the outline of the object or area to be painted.

Another aspect of the present invention provides an image editing method and apparatus for editing a two dimensional (2-D) raster image of a three dimensional (3-D) scene viewed from a given viewpoint, which allows a user to designate an area of the 2-D image to be edited in dependence upon depth values stored for the pixels in the image, which represent the distance between said viewpoint and points in the 3-D scene represented by the pixels.

According to this aspect, the present invention provides a computer-based image editing apparatus for editing a two dimensional (2-D) raster image of a three dimensional (3-D) scene viewed from a given viewpoint, comprising: means for storing the 2-D raster image to be edited together with depth values for the pixels in the image, said depth values representing the distance between said viewpoint and points in the 3-D scene represented by the pixels; designating means, responsive to an input from a user, for designating part of the 2-D image to be edited; and modifying means for modifying the designated part of the image, wherein said designating means is operable to designate the part of the 2-D image in dependence upon the stored depth values.

Another aspect of the present invention provides an image editing method and apparatus which allow a user to apply semi-transparent paint using multiple brush strokes, wherein painting is inhibited in areas of overlap between different brush strokes. This allows a user to be able to apply paint evenly over a required area in the 2-D image without having to worry about overlapping brush strokes.

According to this aspect, a computer-based image editing apparatus is provided for editing a two dimensional (2-D)

raster image, comprising: means for defining a current editing session; designating means for designating a swathe of pixels to be edited in response to a corresponding input by a user; means for applying a user selected semi-transparent paint to said designated swathe of pixels; and inhibiting means for inhibiting the application of paint to pixels in the current swathe being painted which have already been painted during the painting of a previous swathe in the current editing session.

Another aspect of the present invention provides a 2-D raster image editing method and apparatus which can apply texture to the image which varies in dependence upon the tonality of the image.

According to this aspect, the present invention provides a computer-based image editor for editing a two dimensional (2-D) raster image, comprising: means for storing the 2-D raster image to be edited and a 2-D texture map; and means for applying the 2-D texture map to the 2-D image in dependence upon the tonality of the 2-D raster image. The texture applied may be hatching lines which are made thicker in darker areas of the image and thinner in lighter areas of the image.

Another aspect of the present invention provides a 2-D raster image editing method and apparatus which can designate part of the 2-D image to be edited in dependence upon stored material values representing the material of an object in the 3-D scene represented by that pixel.

Embodiments of the present invention will now be described by way of example, with reference to the accompanying drawings in which:

FIG. 1 is a block diagram showing the general arrangement of a image processing apparatus according to an embodiment of the invention;

FIG. 2 schematically illustrates an apparatus according to an embodiment of the present invention for generating and modifying a 2-D raster image of a 3-D scene;

Figure 2:
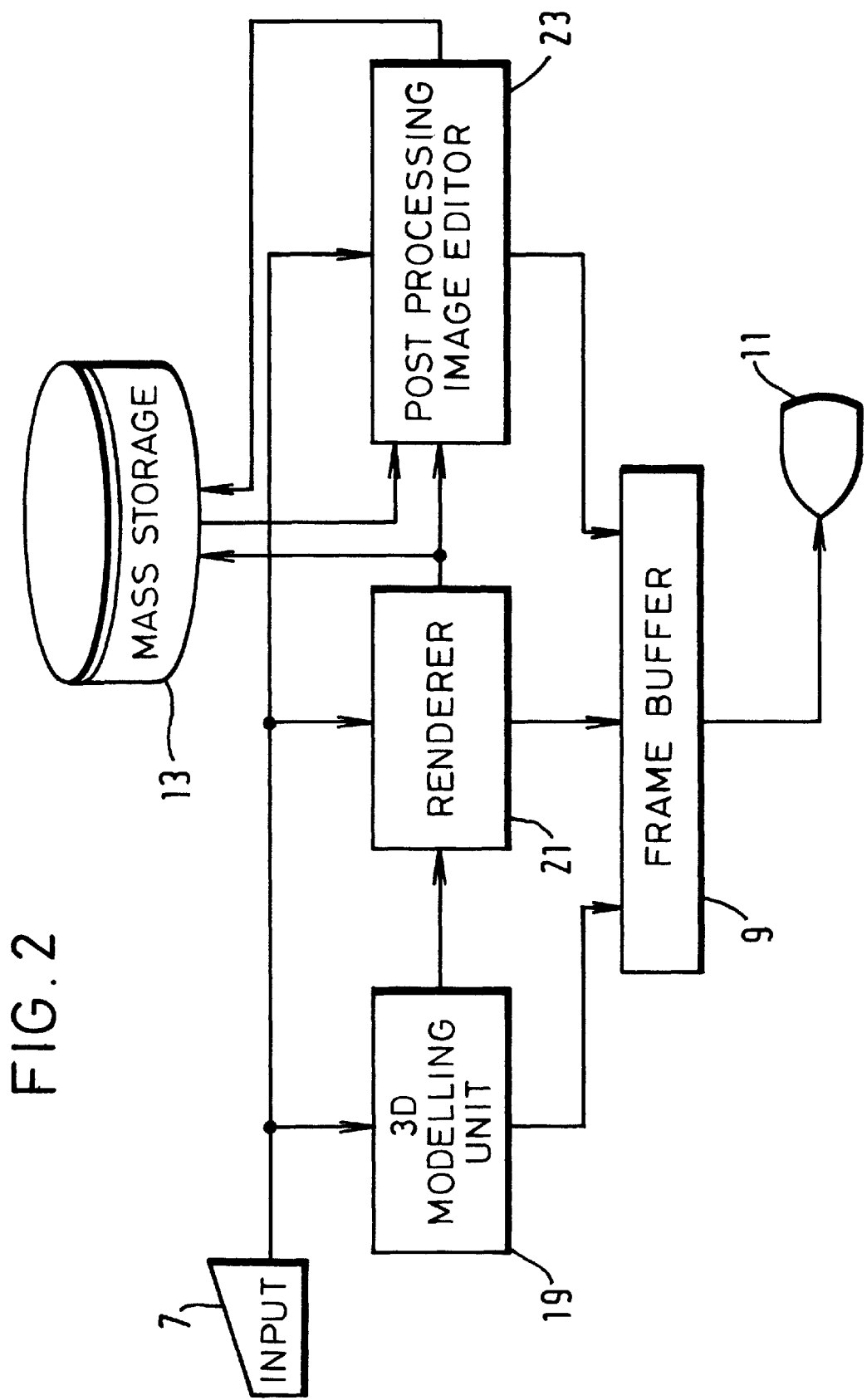
Figure 7:
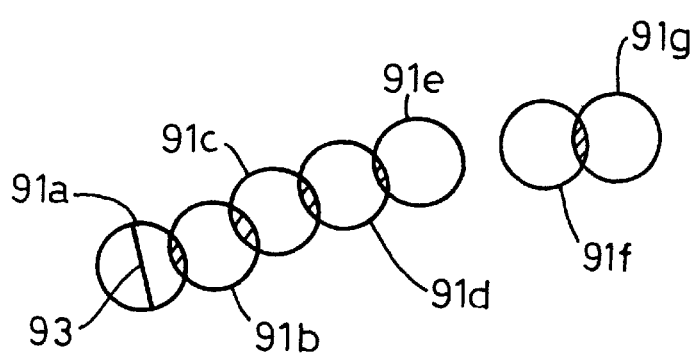
Figure 8:
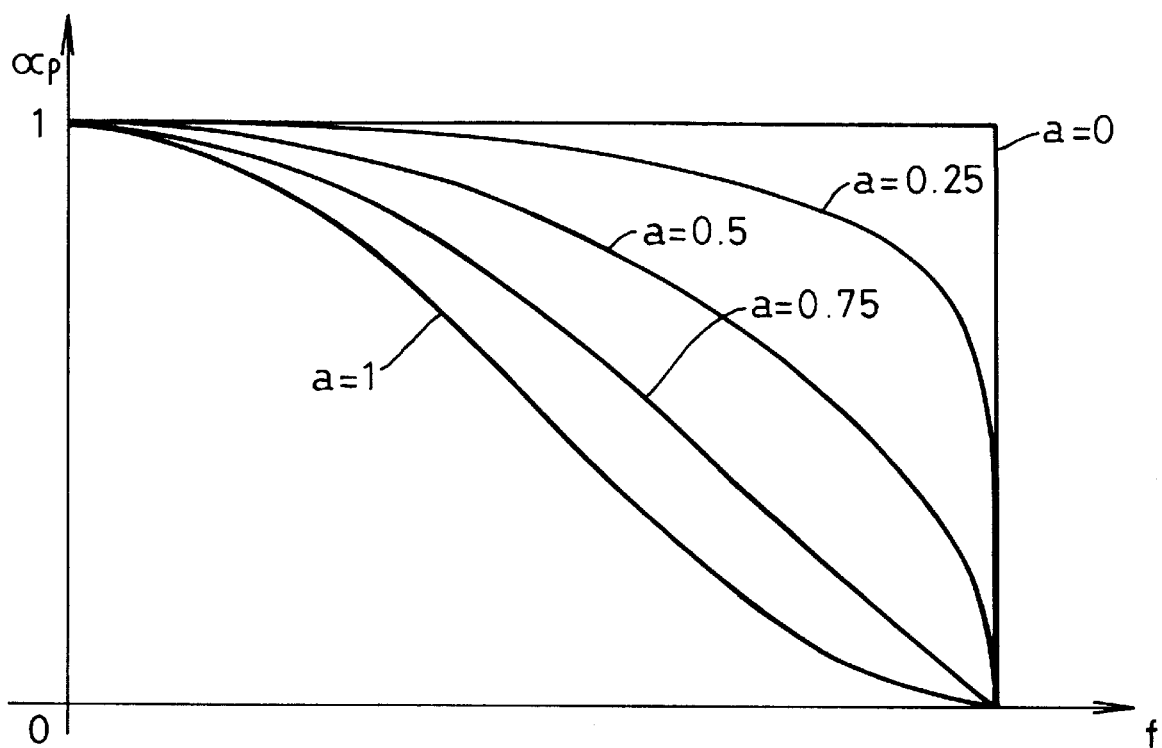
Figure 9:
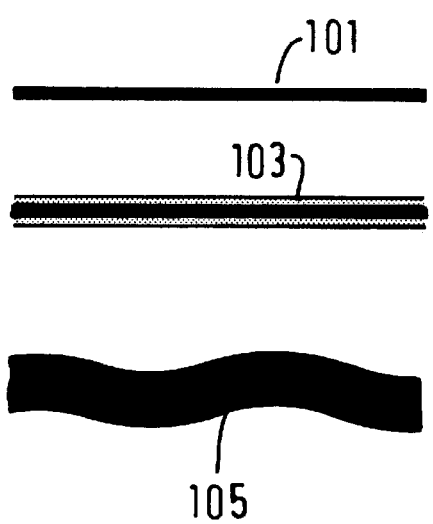
Figure 10:
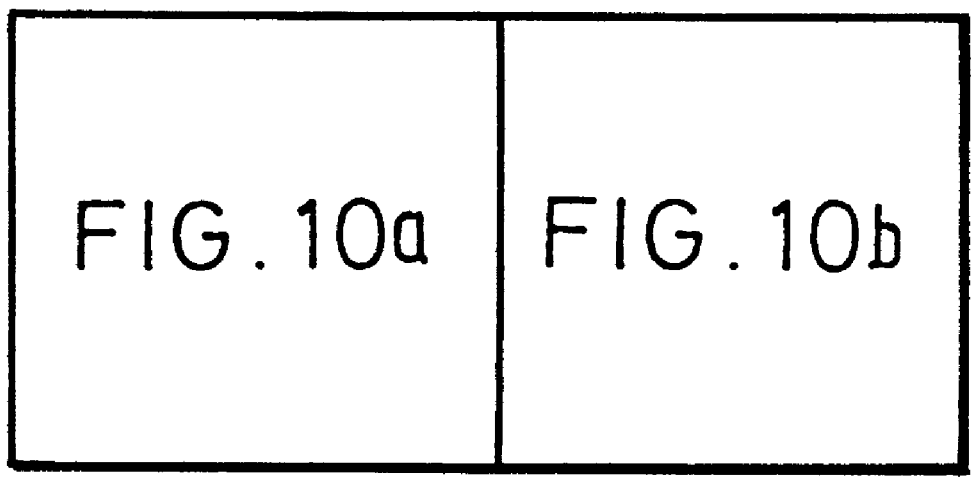
Figure 10B:
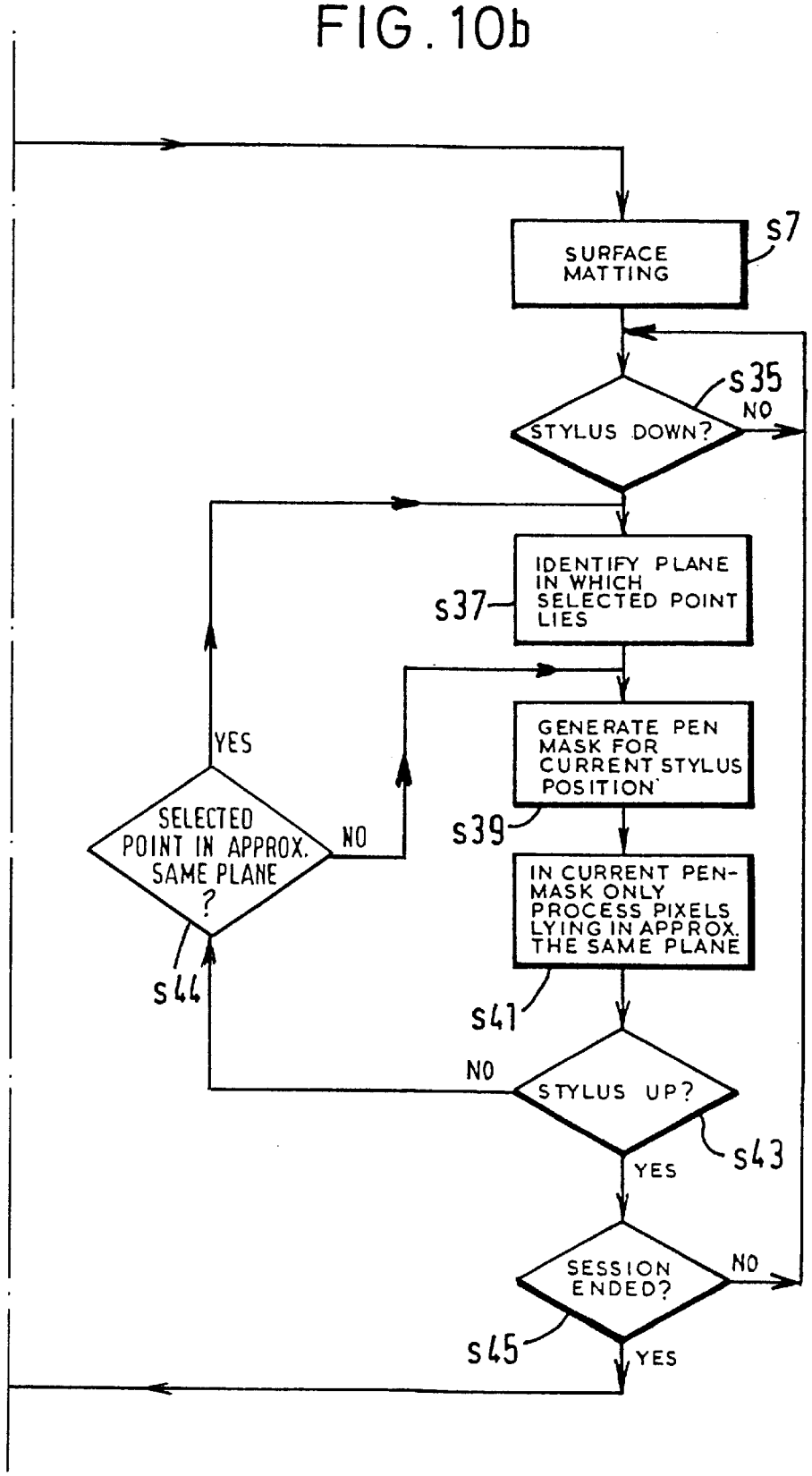
Figure 11:
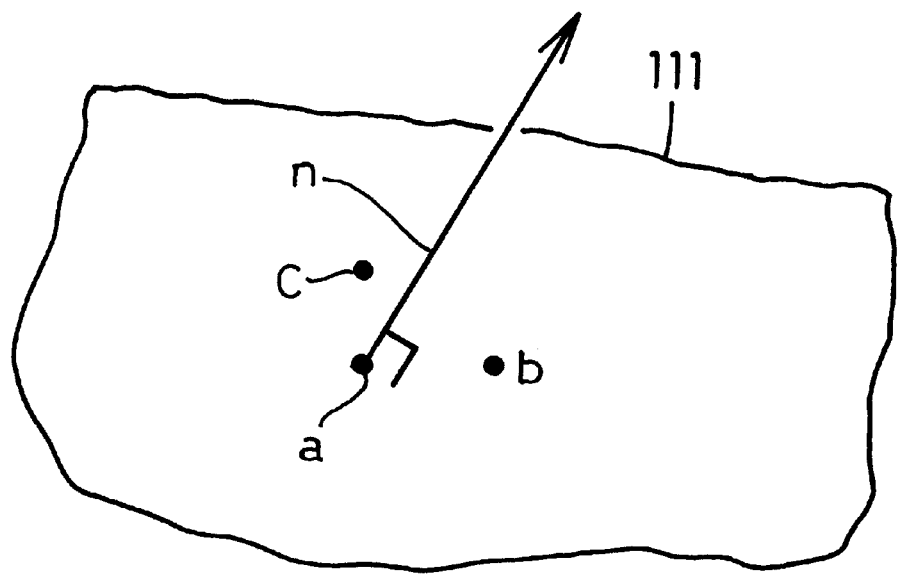
Figure 12:
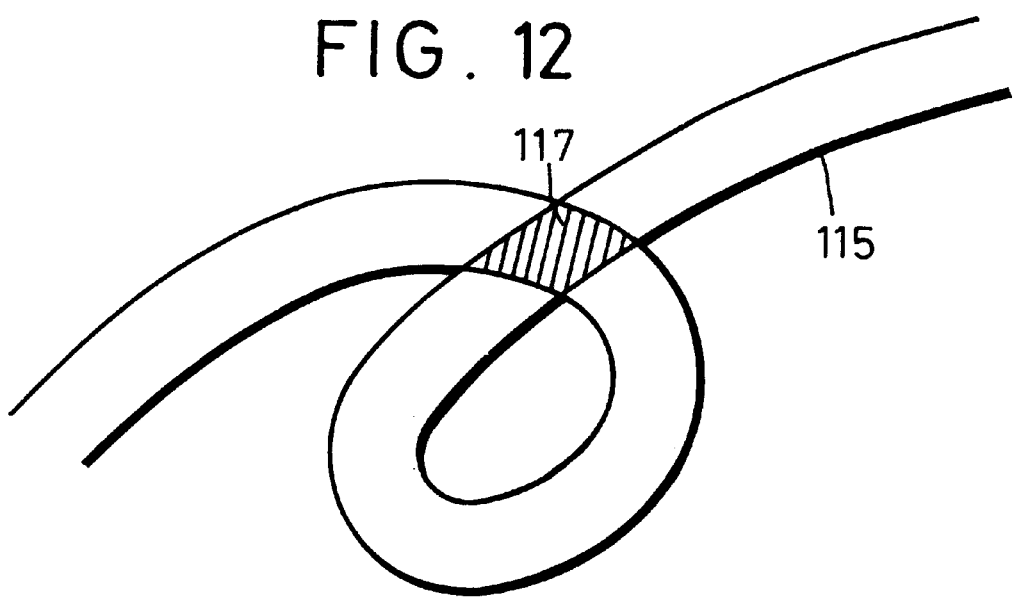
Figure 13:
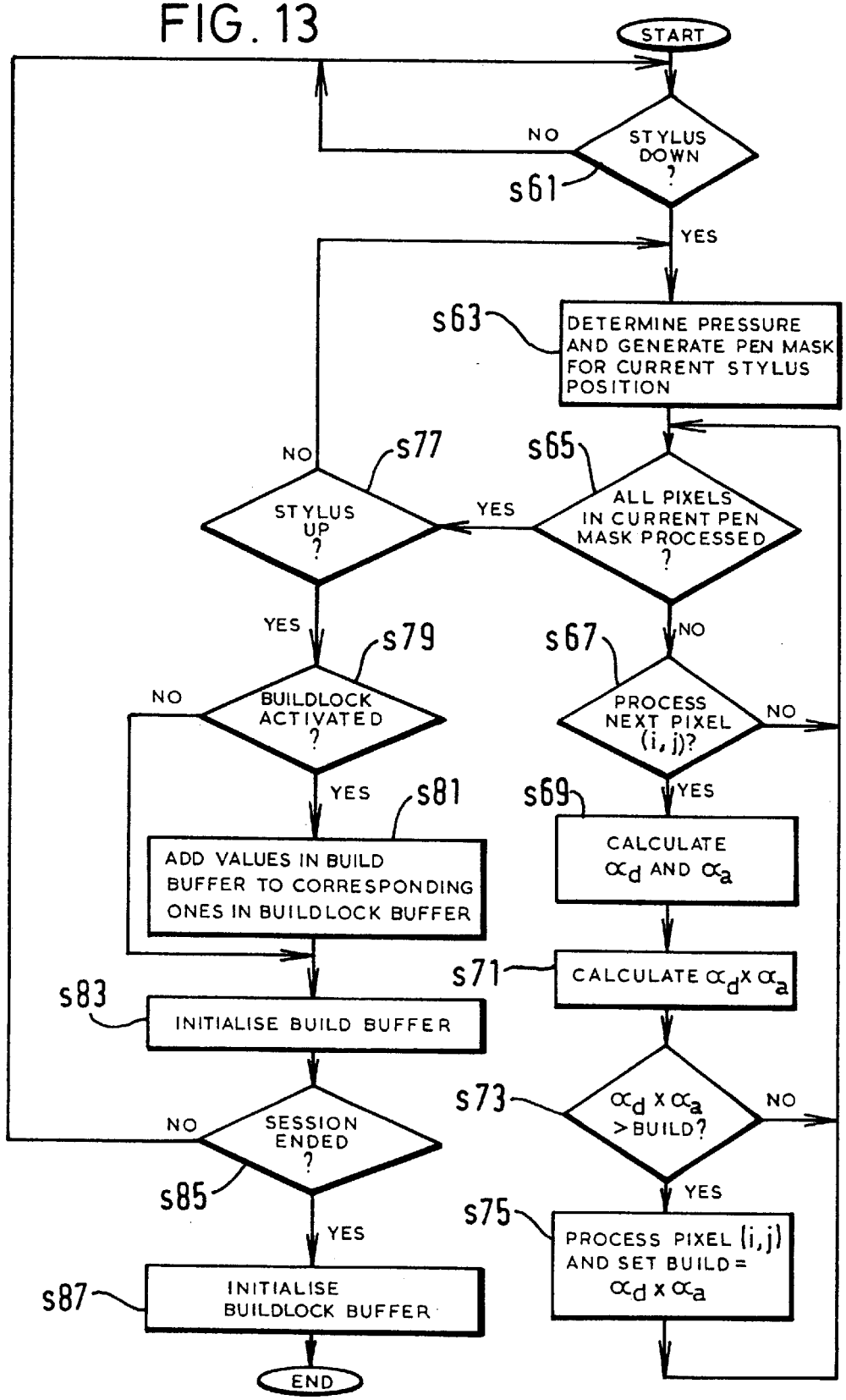
Figure 14:
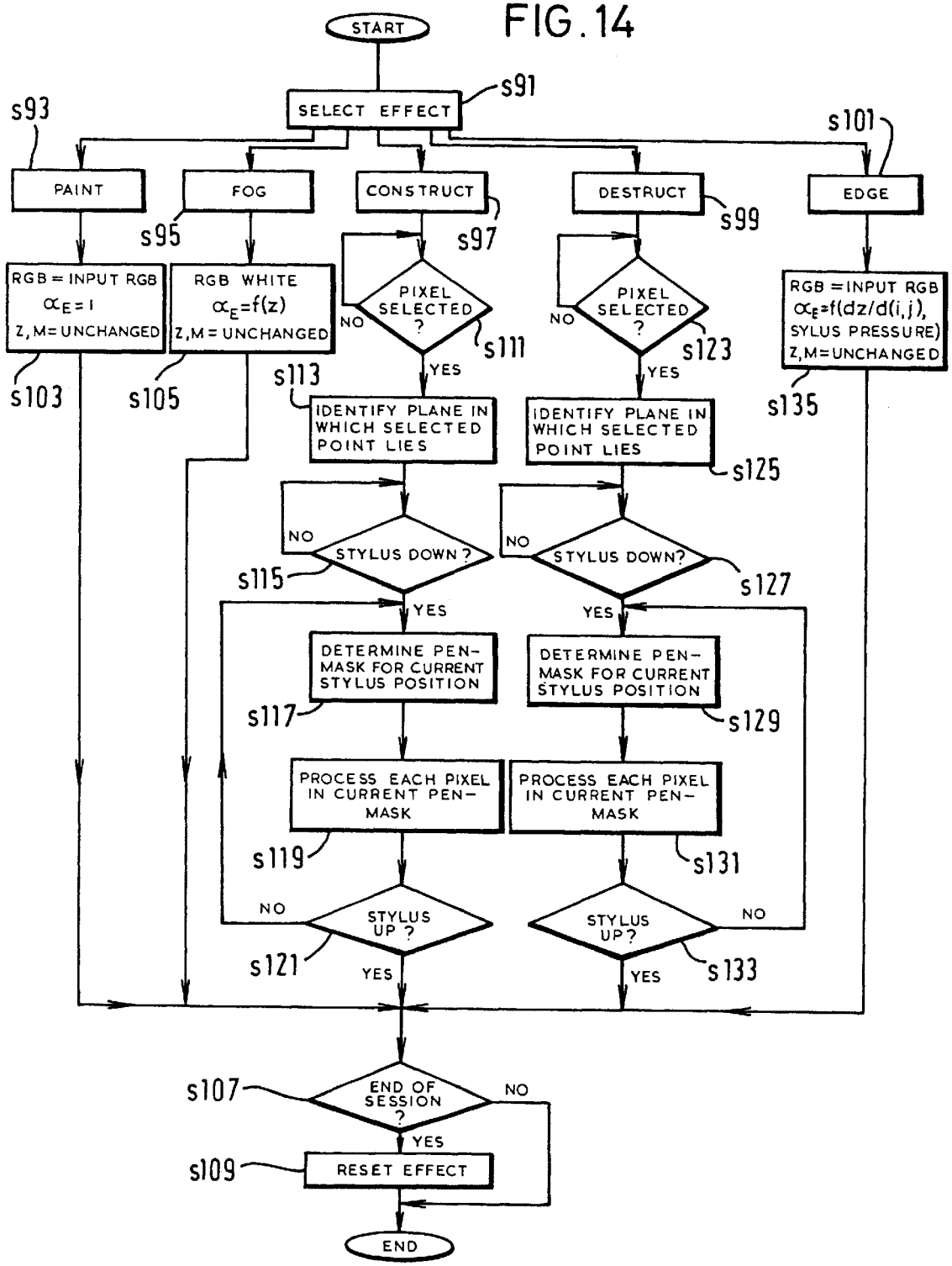
Figure 15:
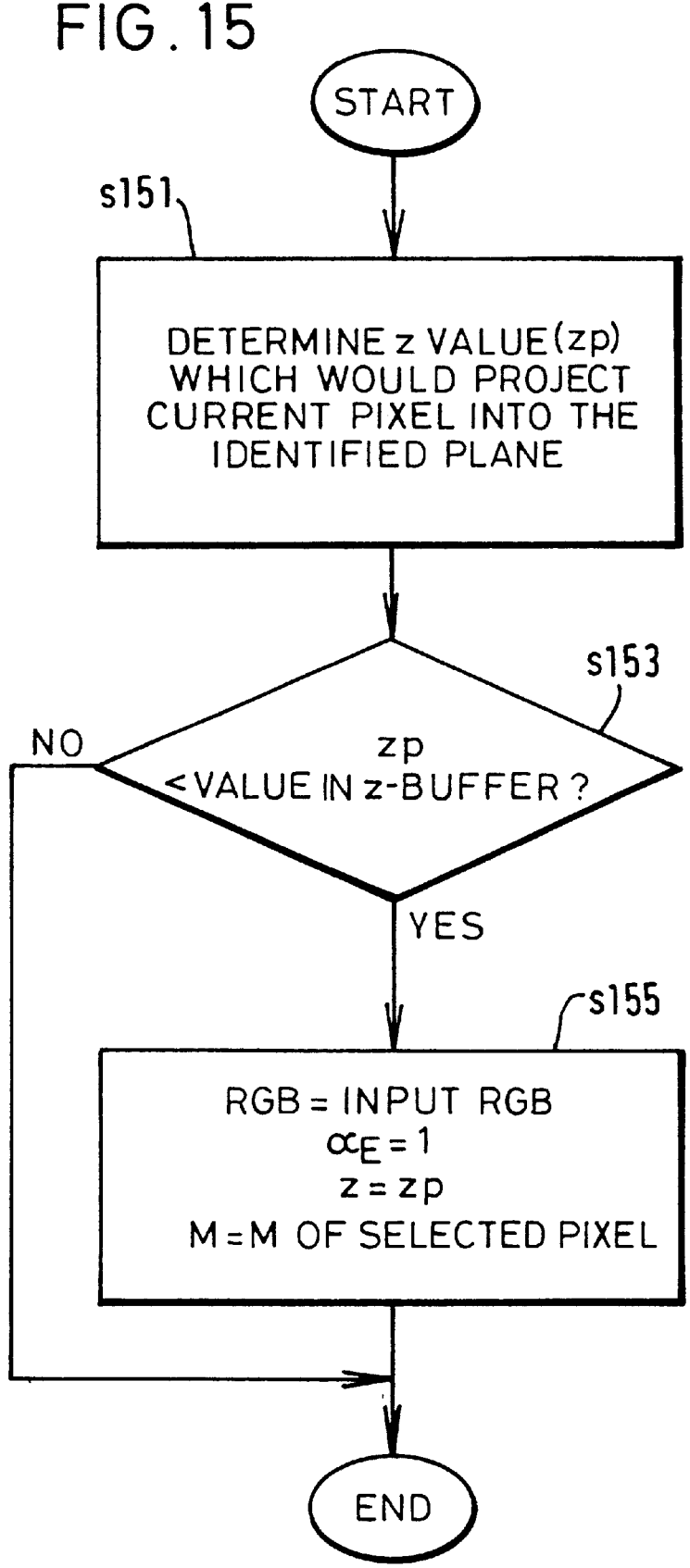
Figure 16:
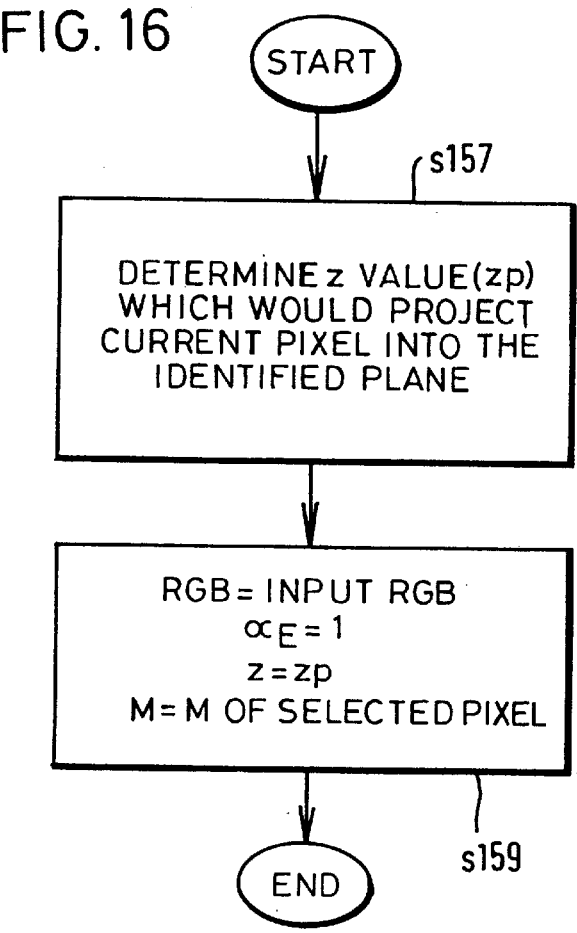
Figure 17:
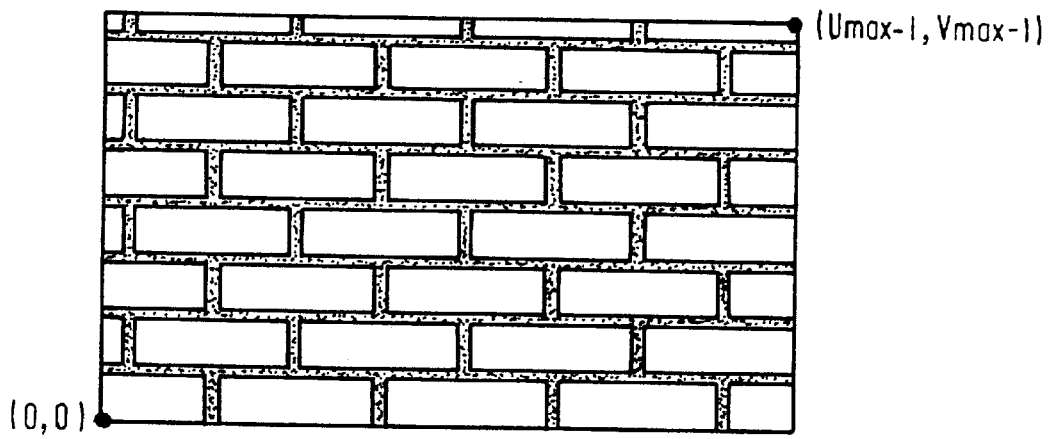
Figure 18:
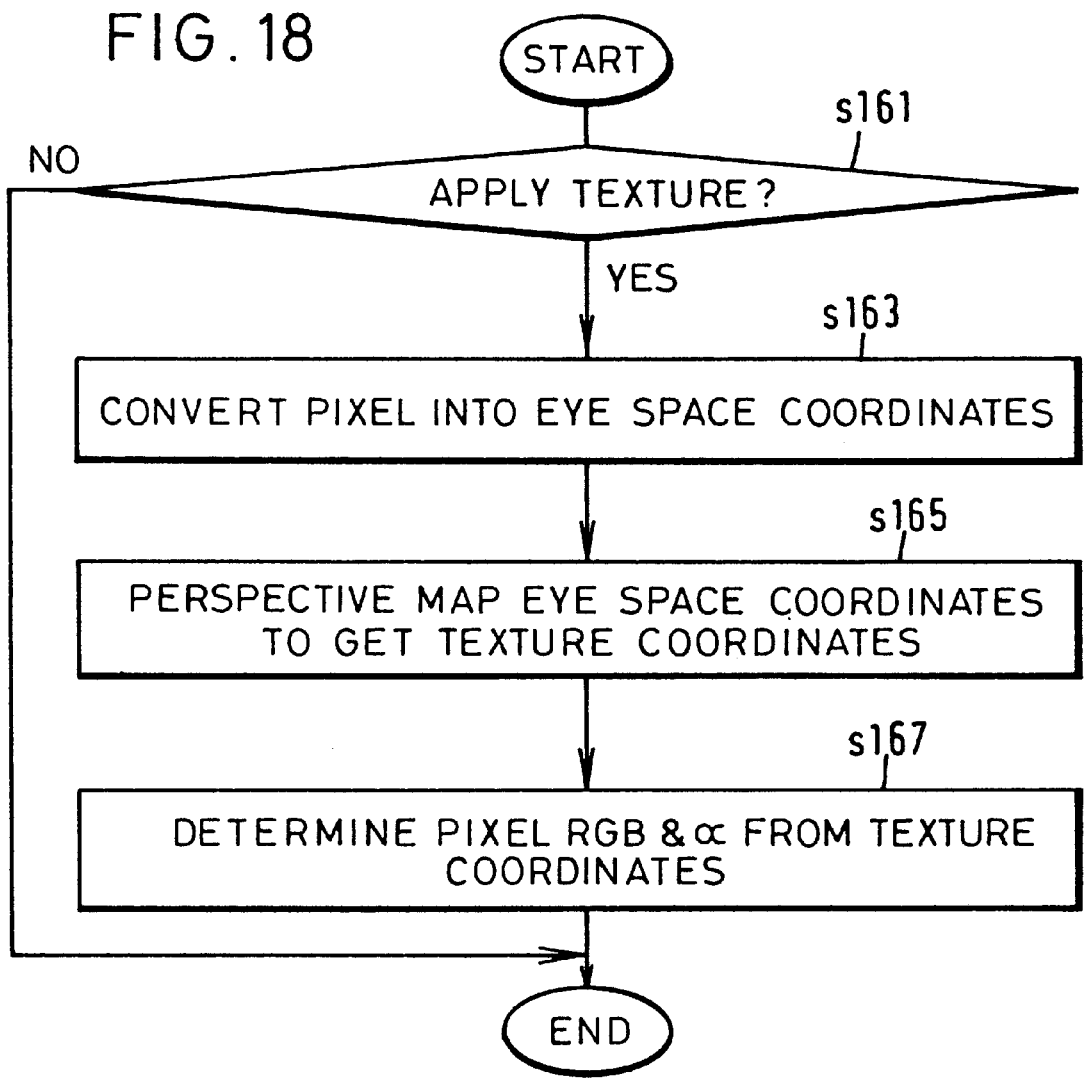
Figure 19:
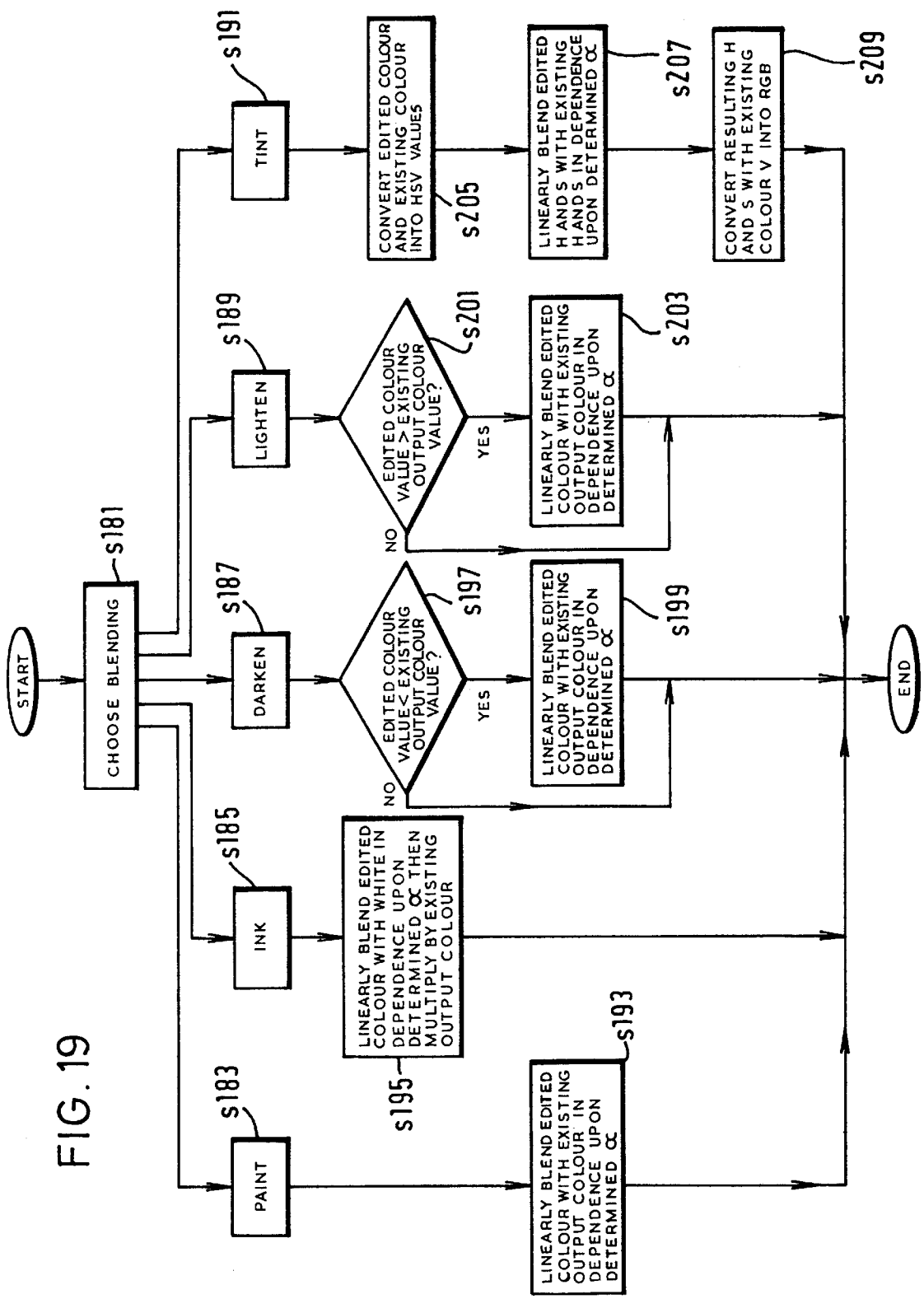
Figure 20:
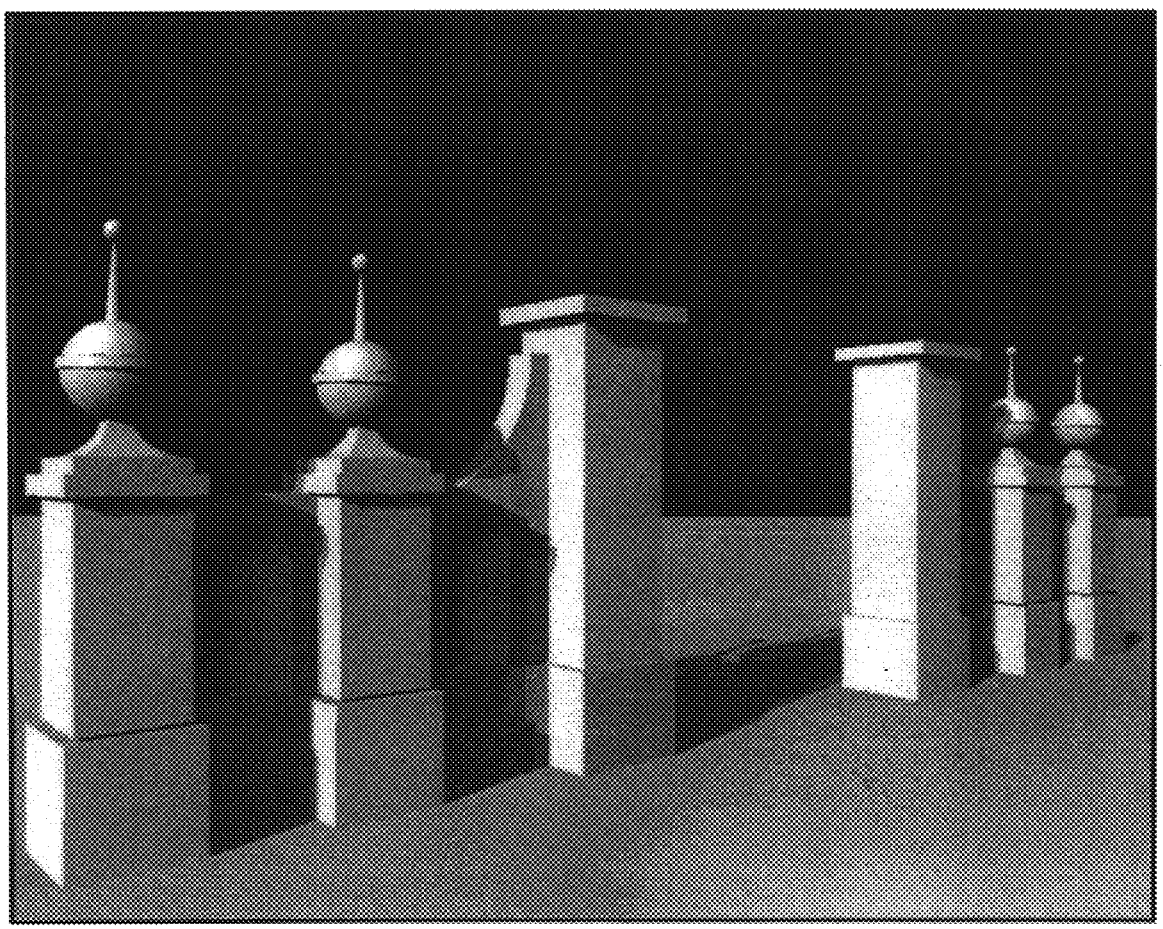
Figure 21:
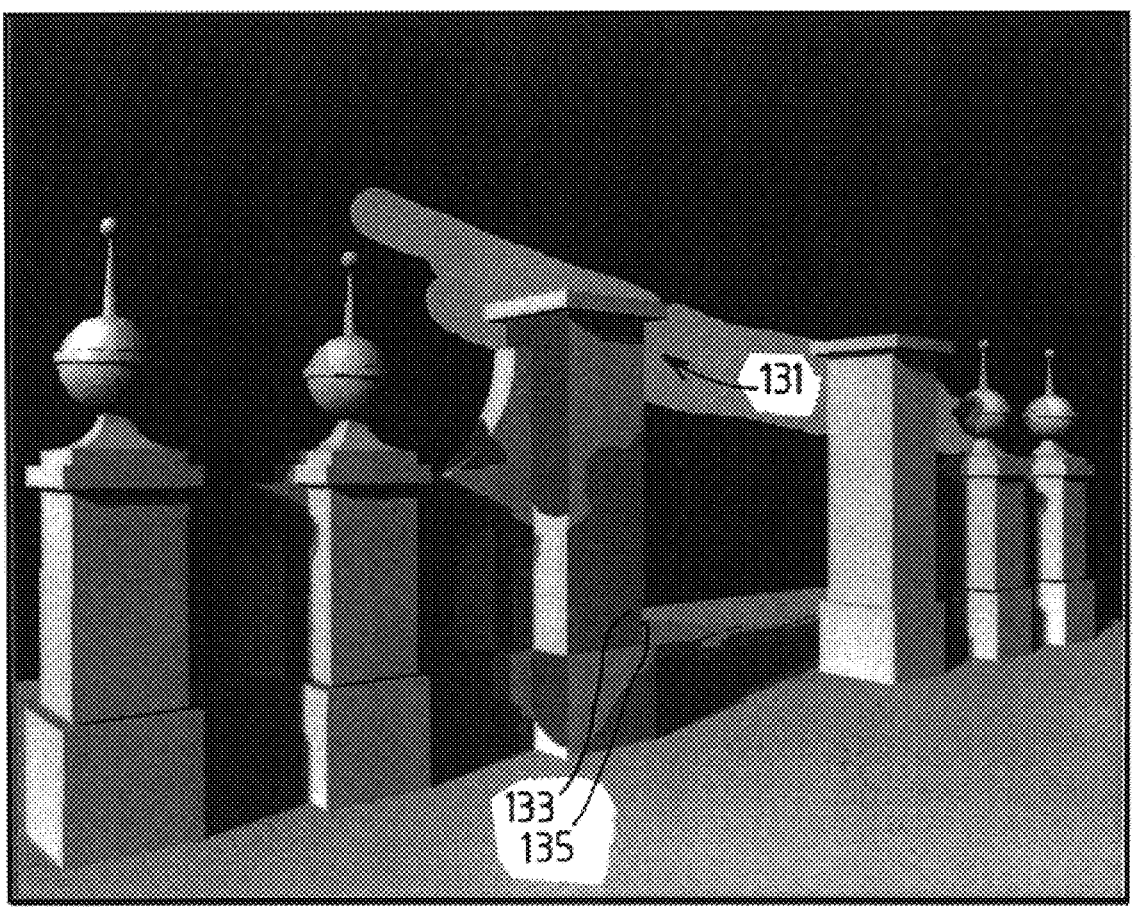
Figure 22:
Figure 23:
Figure 24:
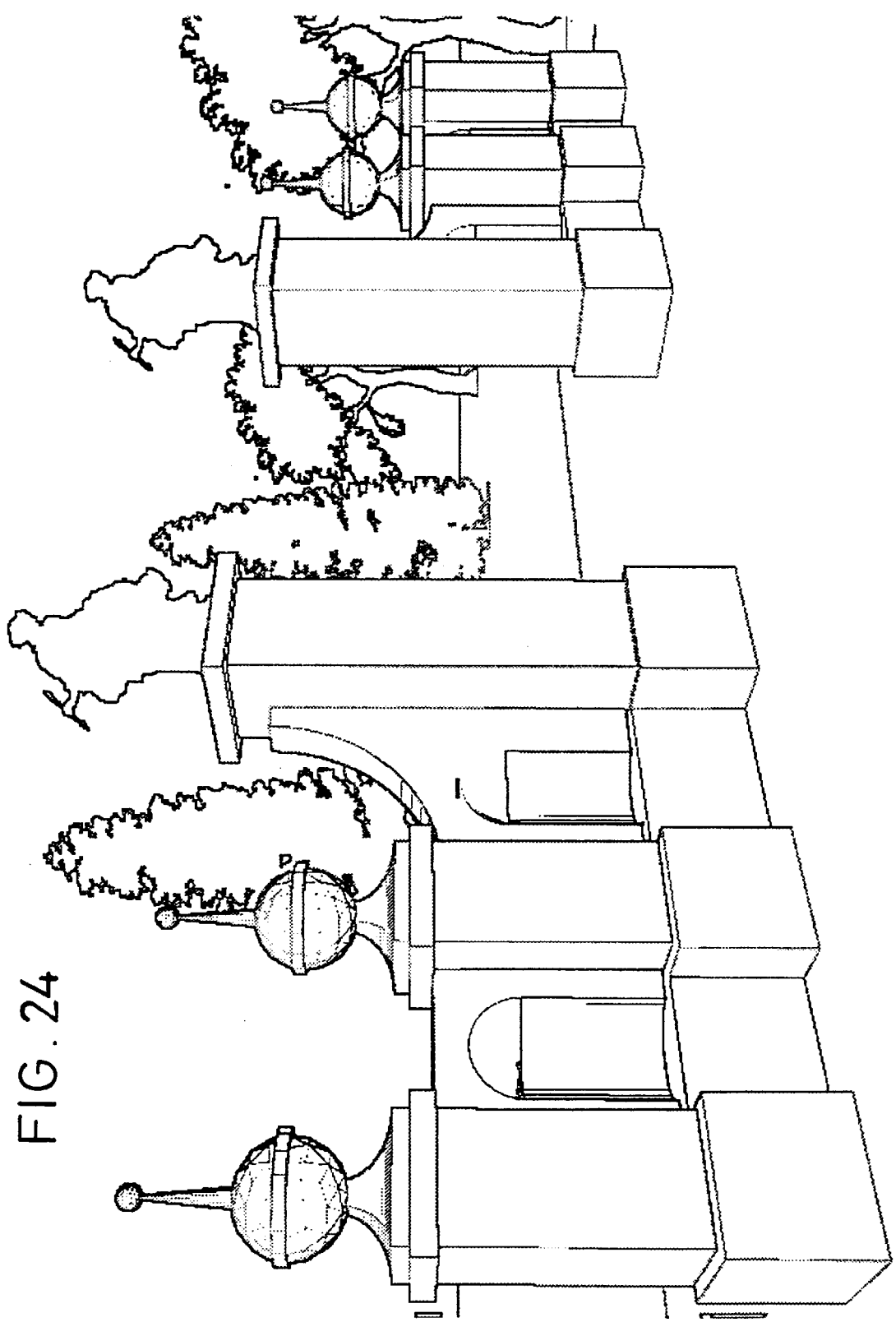
Figure 25:
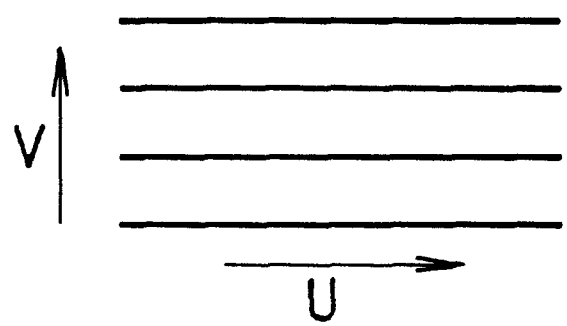
Figure 26:
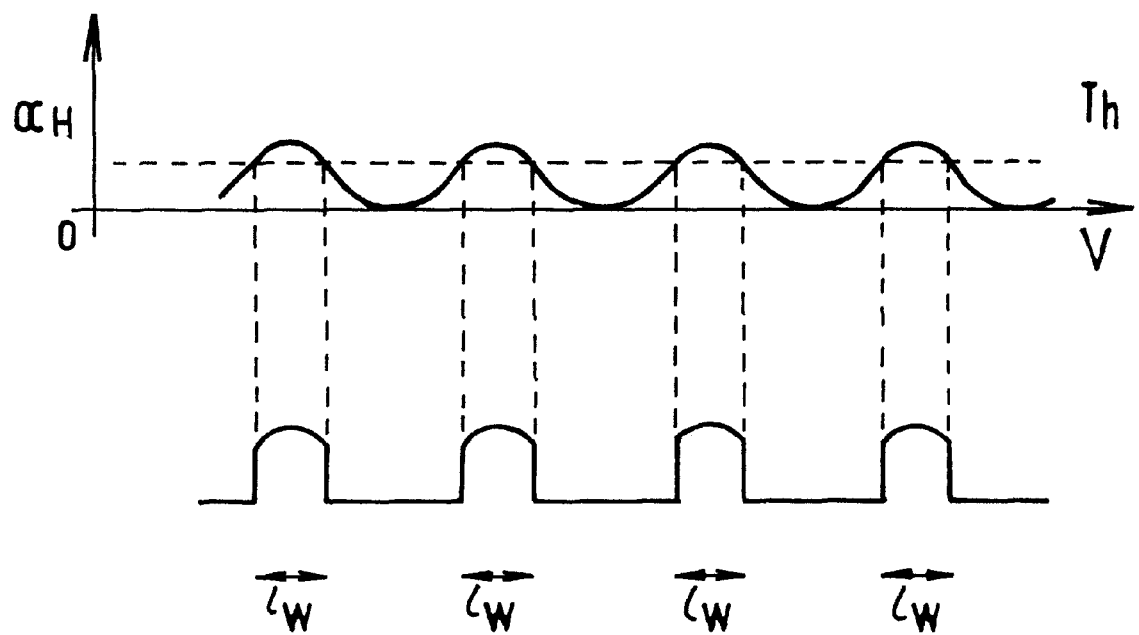
Figure 27:
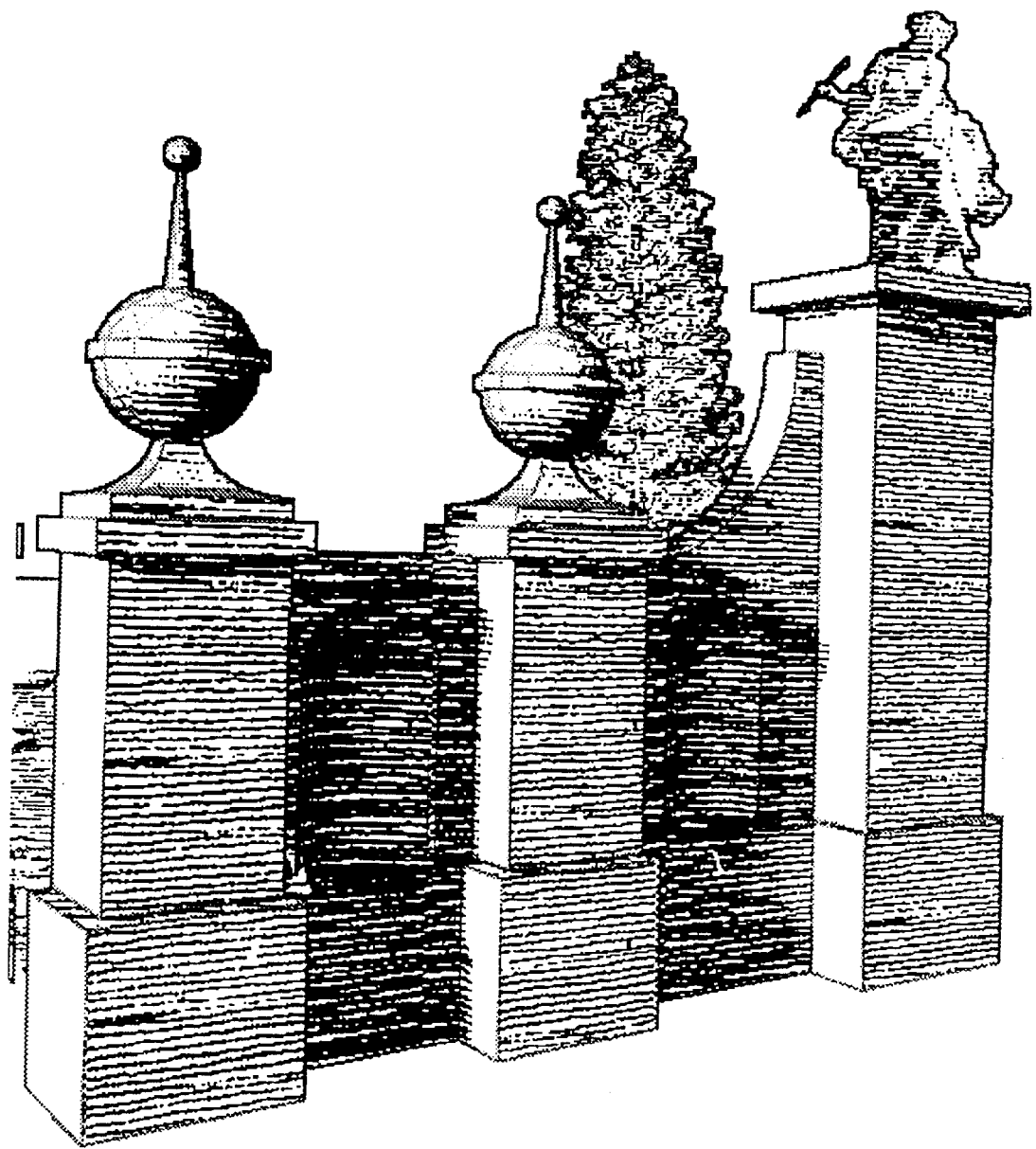

FIG. 7 schematically illustrates the way in which a paintbrush tool of the image editor shown in FIG. 2 generates a brush stroke by applying paint in overlapping circular pen masks to an image being edited;

FIG. 8 illustrates the way in which the amount of paint applied to pixels in each pen mask varies radially from the centre of the pen mask to its edge for different hardnesses of brush;

FIG. 9 illustrates three different line types which can be applied to an image being edited by the image editor shown in FIG. 2;

FIG. 10 is a flow diagram illustrating the processing steps involved for different types of matting which can be chosen by a user when editing an image using the image editor shown in FIG. 2;

FIG. 11 schematically illustrates a plane in 3-D space, three points which lie in that plane and a vector which extends from one of the three points which is orthogonal to the plane;

FIG. 12 schematically illustrates a brush stroke applied by a user which crosses itself;

FIG. 13 is a flow diagram illustrating the processing steps involved in a build lock unit of the image editor shown in FIG. 2, which when activated allows paint to be evenly applied to the image even when pixels are selected for painting more than once by the image editor;

FIG. 14 is a flow diagram illustrating the processing steps involved for changing the colour of a pixel being processed for different types of user selectable effect;

FIG. 15 is a flow diagram illustrating the processing steps involved in processing a pixel when a construct effect is selected;

FIG. 16 is a flow diagram illustrating the processing steps involved in processing a pixel when a destruct effect is selected;

FIG. 17 illustrates a brickwork texture pattern which can be applied in perspective to objects within the 3-D scene represented by the 2-D image;

FIG. 18 is a flow diagram illustrating the processing steps involved in determining the colour of a pixel when a 3-D texture is being applied to an object within the 3-D scene represented by the image being edited by the image editor shown in FIG. 2;

FIG. 19 is a flow diagram illustrating the processing steps involved in different types of blending operations which can be chosen by a user for blending an edited colour of a pixel with the existing colour of a pixel;

FIG. 20 illustrates an example of a rendered 2-D image of a 3-D scene from a given viewpoint output by the renderer 21;

FIG. 21 shows the rendered 2-D image shown in FIG. 20 after some editing has been performed using the image editor shown in FIG. 2;

FIG. 22 shows the rendered 2-D image shown in FIG. 21 after further editing operations have been performed using the image editor shown in FIG. 2;

FIG. 23 shows the final edited 2-D image output by the image editor shown in FIG. 2;

FIG. 24 shows a pencil outline drawing of a 2-D image of a 3-D scene obtained using an edge tool available in the image editor shown in FIG. 2;

FIG. 25 schematically illustrates a sample of hatching lines which can be applied to objects in a 3-D scene represented by a 2-D image according to a second embodiment;

FIG. 26 schematically illustrates the way in which the hatching lines are generated and varied in dependence upon a variable threshold;

FIG. 27 illustrates a 2-D image of a 3-D scene having a hatching pattern applied to the surfaces of the objects in the 3-D scene which varies with the tonality of the original 2-D image.

Figure 1:
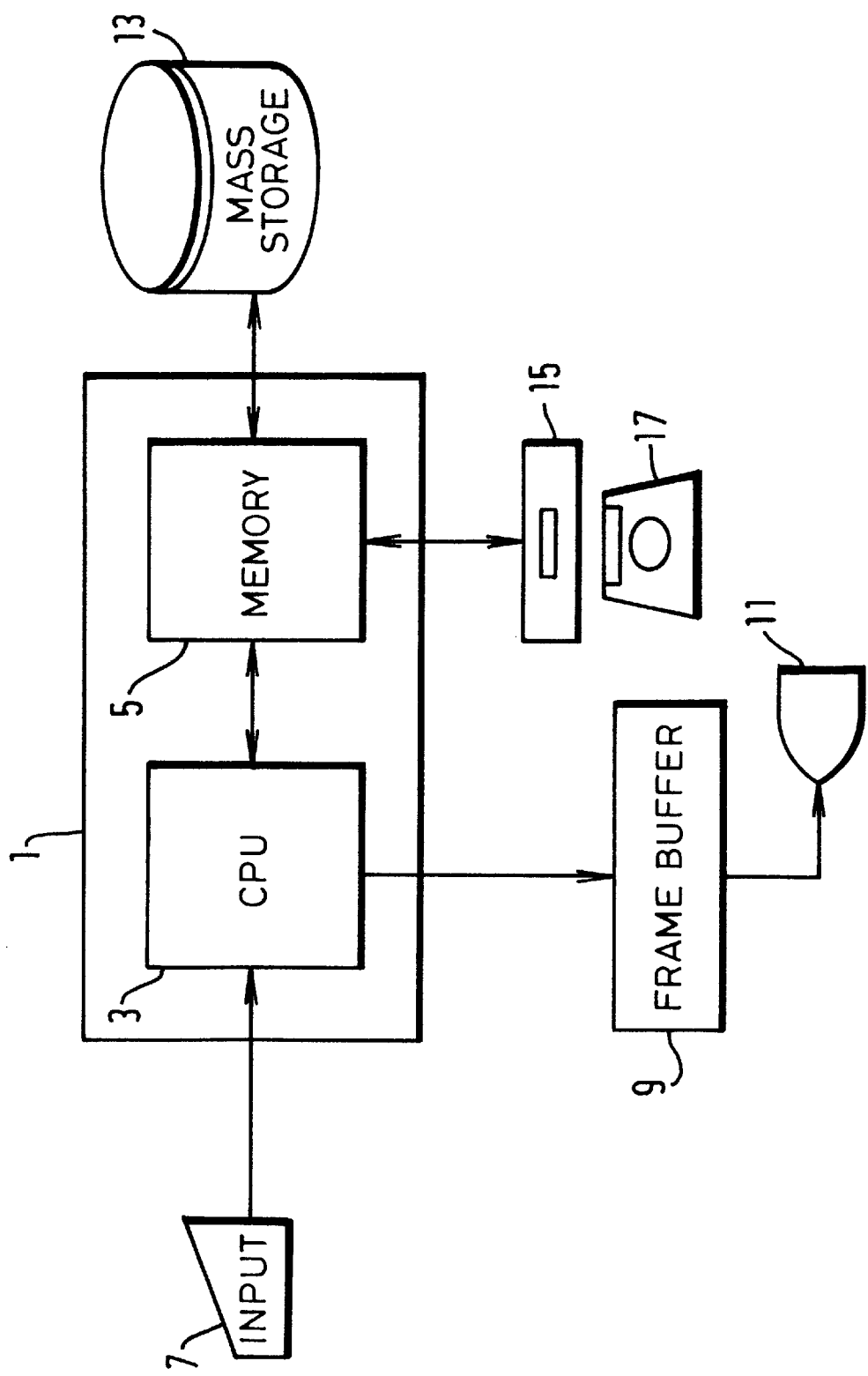

FIG. 1 is a block diagram showing the general arrangement of an image processing apparatus according to an embodiment of the present invention. In the apparatus, there is provided a computer 1, which comprises a central processing unit (CPU) 3 connected to memory 5 which is operable to store a program defining the sequence of operations of the CPU 3, and to store object and image data used in calculations by the CPU 3.

Coupled to an input port of the CPU 3, there is an input device 7, which in this embodiment comprises a keyboard and a digitiser tablet with an associated pressure sensitive stylus. Instead of, or in addition to, the digitiser tablet and stylus, another position sensitive input device (pointing device), such as a mouse or tracker ball may be provided.

A frame buffer 9 is also provided and is coupled to the CPU 3 and comprises a memory unit arranged to store image data relating to at least one image, for example by providing one (or several) memory location(s) per pixel of the image. The value stored in the frame buffer for each pixel defines the colour or intensity of that pixel in the image. The images are 2-D arrays of pixels, and are conveniently described in terms of cartesian coordinates, so that the position of a given pixel can be described by a pair of x-y coordinates. This representation is convenient since the image is displayed on a raster scan display 11. Therefore, the x coordinate maps to the distance along the line of the display and the y coordinate maps to the number of the line. The frame buffer 9 has sufficient memory capacity to store at least one image. For example, for an image having a resolution of 1000×1000 pixels, the frame buffer 9 includes $10^6$ pixel locations, each addressable directly or indirectly in terms of pixel coordinates x,y. Coupled to the memory 5 (typically via the CPU 3), and possibly also to the frame buffer 10, is a mass storage device 13, such as a hard disc drive, having a high data storage capacity. Also coupled to the memory 5 is a disc drive 15 which is operable to accept removable data storage media, such as a floppy disc 17, and to transfer data stored thereon to the memory 5.

The CPU 3, memory 5, frame buffer 9, display unit 11 and mass storage device 13 may be commercially available as a complete system, for example as an IBM compatible personal computer (PC) or a work station such as the Sparc Station available from Sun Microsystems.

A number of embodiments of the invention can be supplied commercially in the form of programs stored on a floppy disc 17 or other medium, or signals transmitted over a data link, so that the receiving hardware becomes reconfigured into an apparatus embodying the invention.

The way in which the apparatus will be used by an artist or designer will now be briefly described with reference to FIG. 2.

In addition to the input device 7, the mass storage device 13, the frame buffer 9 and the display device 11, FIG. 2 shows a 3-D modeller 19 for creating 3-D models of a scene, a renderer 21 for generating a 2-D representation of the 3-D model from a given view point and given input parameters, and a post processing image editor 23 for editing the 2-D image output from the renderer 21.

The user builds up the 3-D model of the scene using well defined geometrical shapes (for example straight lines, rectangles, cuboids, cones, spheres etc) which can be scaled and placed in appropriate positions until a sufficiently detailed model has been created. During this modelling process, the 3-D modeller 19 generates a 2-D raster image of the 3-D model from a user selected viewpoint and displays it on the display 11 via the frame buffer 9. A commercially available and widely used 3-D modeller is Autocad distributed by Autodesk Inc, 111 McInnis Parkway, San Rafael, Calif. 94903, USA. The process involved in generating the 3-D model using the 3-D modeller 19 is well known to those skilled in the art of architectural design and will not be described further.

The 3-D model output by the 3-D modeller 19 is input to the renderer 21, which generates and outputs a 2-D raster image of the 3-D model when viewed from a specific viewpoint for given light sources and other input parameters defined by the user via the input device 7.

The process of rendering, in this embodiment, can be considered as a series of steps dealing with: perspective, lighting, visibility, smoothing of curves and shadows. The renderer 21 generates the 2-D image by dividing the 3-D model into a number of connected polygons or facets, each lying in a given plane and then processing each (with respect to perspective, lighting visibility etc) in turn. Curved surfaces are represented by a large number of small connected facets, whereas surfaces lying in a single plane are represented by a single large facet.

Figure 3:
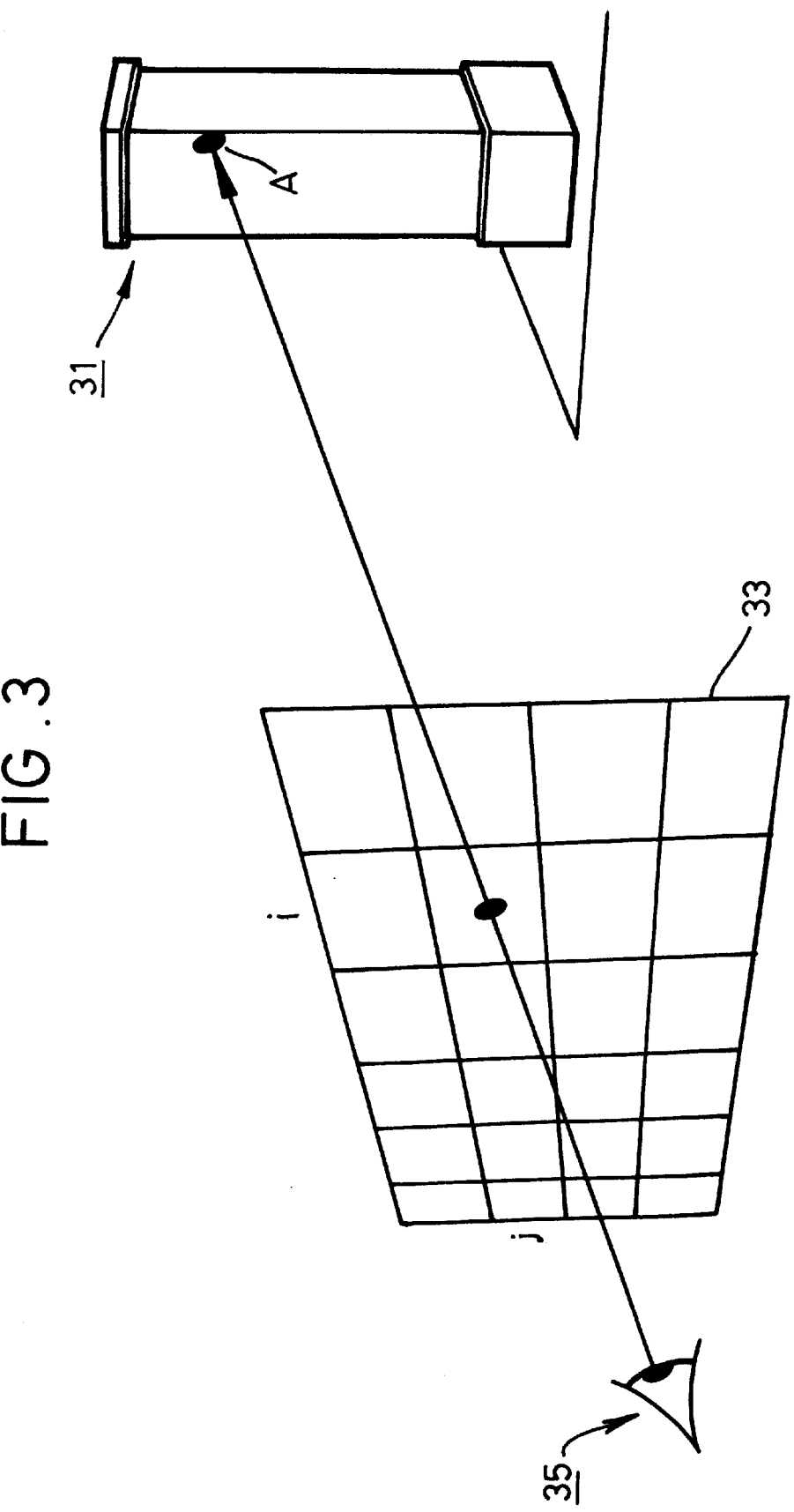
FIG. 3 shows the principle of projecting a 3-D scene onto a 2-D screen from a given viewpoint.
Figure 4:
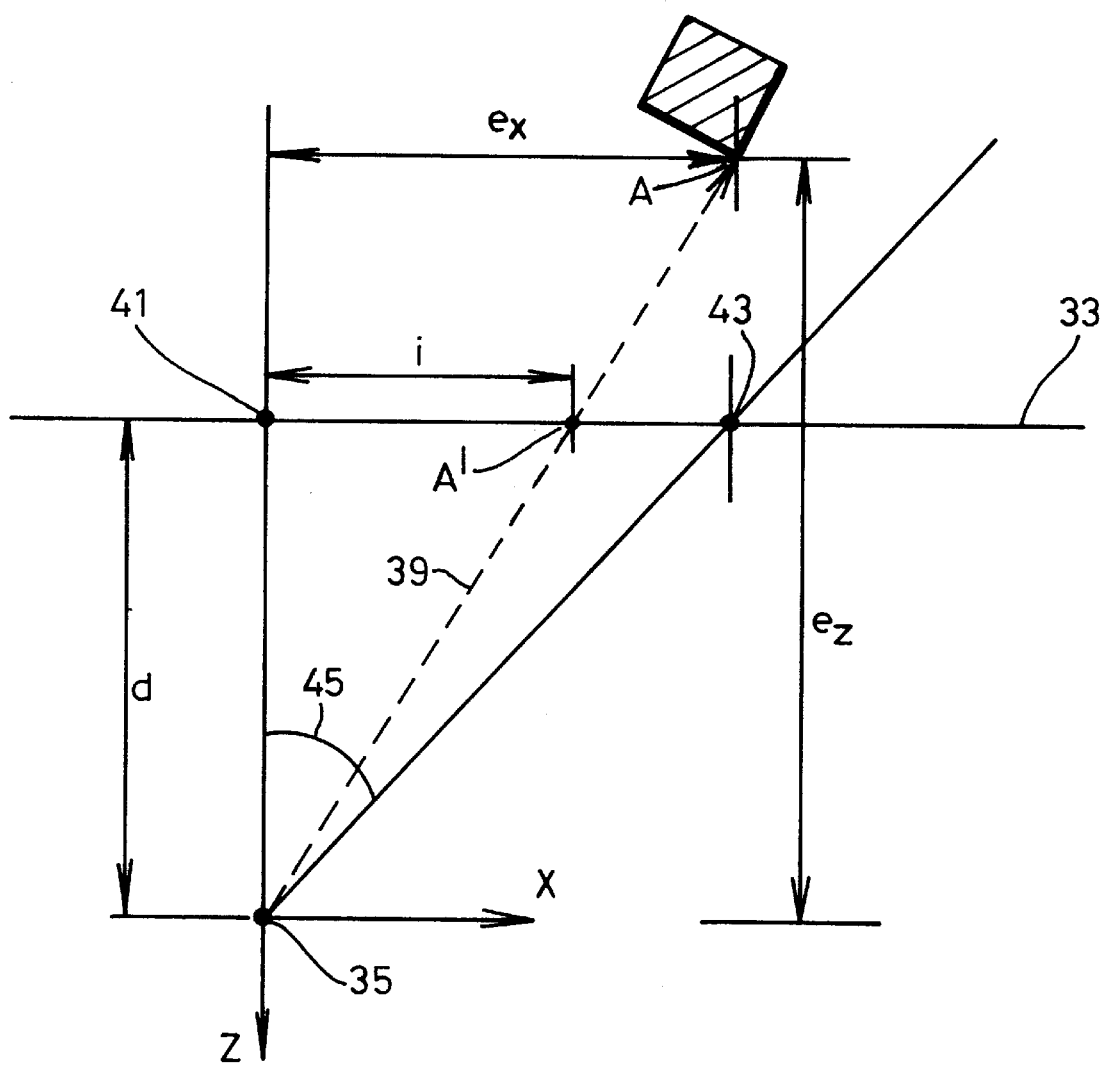
FIG. 4 is a schematic plan view of FIG. 3 showing the geometric relationship between an object in the 3-D scene, the 2-D screen and the viewpoint.

Perspective, which is hard to create on a drawing board by hand, is easy to compute using a computer. The process of calculating perspective will now be briefly described with reference to FIGS. 3 and 4. FIG. 3 shows the way in which a point A in a 3-D scene, generally indicated by reference numeral 31, is projected onto a pixel (i, j) of a screen 33, when viewed from the view point generally indicated by reference numeral 35. FIG. 4 is a schematic plan view of FIG. 3 in which axes have been added to define an eye-space coordinate system, having the viewpoint 35 as the origin. The x-axis in eye-space extends horizontally parallel with the screen, the y-axis vertically (out of the page) and the z-axis orthogonally away from the screen 33 from point 41 which is defined as the centre of projection. The greater of the two possible distances (in pixels) from the centre of projection 41 to the edge of the picture (represented by point 43) is defined as the semi-image-width. In this embodiment, the centre of projection is in the centre of the screen and therefore, the semi-image-width is equal to half the screen size. Obtaining a 2-D image of a 3-D scene in correct perspective involves projecting visible points (points in the 3-D scene which can be seen from the viewpoint) onto the plane of the screen 33. Distant objects will therefore appear smaller than closer ones. The way in which points in the 3-D scene are projected onto the screen 33 will now be described by considering point A.

Point A is represented in eye-space by the coordinates $(e_x, e_y, e_z)$ and is projected along the line of sight (indicated by dashed line 39) to point A' which is at pixel (i, j). Considering similar triangles shown in FIG. 4, it is evident that:

$$\frac{i}{d} = \frac{e_x}{e_z} \qquad (1)$$

multiplying each side by d yields:

$$i = \frac{e_x d}{e_z} = \frac{e_x}{e_z/d} \qquad (2)$$

The value of d is a constant for a given viewpoint 35. Similarly the row of the screen (j) is related to $e_y$ by:

$$j = \frac{e_y d}{e_z} = \frac{e_y}{e_z/d} \qquad (3)$$

In practice, the value of d is not known but can be worked out provided the semi-horizontal angle 45 shown in FIG. 4, together with the semi-image-width are known, by the following equation:

$$d = \frac{\text{Semi-image-width}}{\tan(\text{semi-horizontal angle})} \qquad (4)$$

Therefore, given a point in eye-space, the pixel location of that point in the 2-D projection can be found from equations 2 and 3 above. Similarly, the eye-space coordinates of a point in pixel space can be determined from the inverse of these equations.

In this embodiment, the renderer 12 calculates the lighting for each facet by considering its reflectivity (determined by the material of the facet) and the orientation of its vertices with respect to the light source. Values inside the facet are obtained using an averaging technique. Smoothing edges created by the facets is achieved by averaging values between adjacent facets. Shadows are computed geometrically, by determining which surfaces can be "seen" from the light source and which can not (and should therefore be in shadow). When there are multiple light sources, a surface must be classified relative to each of them. Light reflected from one surface onto another is ignored in order to simplify the calculations.

One of the simplest algorithms for determining what is visible from the viewpoint 35 and what is not is called the z-buffer algorithm. This algorithm breaks down each facet into pixels and calculates the corresponding z-coordinates (relative to the viewpoint) for each pixel therein. The algorithm then processes each pixel in the facet in turn by determining if a point on a previously rendered facet, which corresponds to the current pixel being processed, is in front of or hidden by the point on the current facet being rendered which corresponds to the current pixel. If the point on the current facet is further away from the previous point (i.e. it is hidden), then nothing happens. If on the other hand, the point on the current facet is nearer than the previous point, then that point replaces the previous point and the z-coordinate of that point is stored for that pixel in a buffer called the z-buffer. Once all facets of all objects in the 3-D scene have been processed in this way, the result will be a 2-D raster image showing only the visible surfaces in the 3-D scene from the given viewpoint 35. Further details of the z-buffer algorithm can be found from page 668 to page 672 of Computer Graphics Principles and Practice, second edition by Foley, Van Dam et al, Addison Wesley, Reading Mass., USA.

Once the renderer 21 has dealt with the perspective, lighting, visibility, smoothing of curves and shadows, it outputs the resulting 2-D image. The remaining processes involved in completing the render, such as adding colour, textures, entourage and various image effects are left to the user to add by hand using the image editor 23 shown in FIG. 2. To enable the image editor 23 to be able to perform these types of image editing functions in perspective, the z-buffer which was generated during the rendering process described above is output by the renderer 21 together with the 2-D image. Prior to being output, the z-buffer is, however, scaled by d to simplify the processing involved in converting pixel coordinates into eye-space coordinates and vice-versa, using equations 2 and 3 above. Additionally, in this embodiment to provide increased flexibility, a "material buffer" (which stores a value for each pixel in the image indicative of the material, e.g. sky, earth, wood, brick, stone etc, which is to be found at that pixel) which is also generated and used by the renderer 21 is also output by the renderer 21 for use by the image editor 23. Since these complex calculations are not being performed by the renderer 21, the time taken to perform the rendering operation is reduced considerably.

Figure 5:
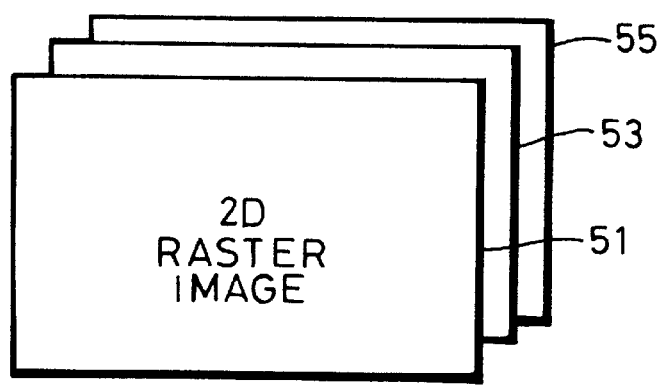
FIG. 5 is a schematic diagram illustrating the 2-D colour raster image together with a corresponding z-buffer and material buffer which form an input file for editing by an image editor shown in FIG. 2.

FIG. 5 illustrates the 2-D raster image 51 together with the associated z-buffer 53 and material buffer 55 output from the renderer 21. These are stored in the mass storage device 13 as an input file for the image editor 23. When an input file is to be edited by the image editor 23, a copy of the 2-D raster image 51 is placed in memory 5 for subsequent alteration by the user and in frame buffer 9 for display on the display 11. A copy of the z-buffer 53 and the material buffer 55 is also made but these are stored in the mass storage device 13 and only written to memory 5 when needed. Once an image has been edited by the image editor 23 and the user wishes to save the edited image, as displayed on the display 11, then it is saved to an output file having identical structure to the input file. Consequently, this output file can be re-edited as if it were an original input file. This is a powerful tool and offers a significant advantage over current renderers which can only start with the 3-D model and generate a rendered image based on numerical input parameters which are input before the renderer 21 begins rendering.

As mentioned above, the 2-D image output by the renderer 21 is edited by the user with the post processing image editor 23. In particular, the image editor 23 can be used to add, among other things, texture, colour, elements of entourage, such as figures and vegetation and other image effects such as fog and the like. As will be described below, during the image editing process, the image is displayed on the display 11 and changes which are made to the image by the user are displayed automatically in real time. In this way, the designer is able to have continuous feedback from the computer via the display 11 when editing the image using the input device 7.

Figure 6A:
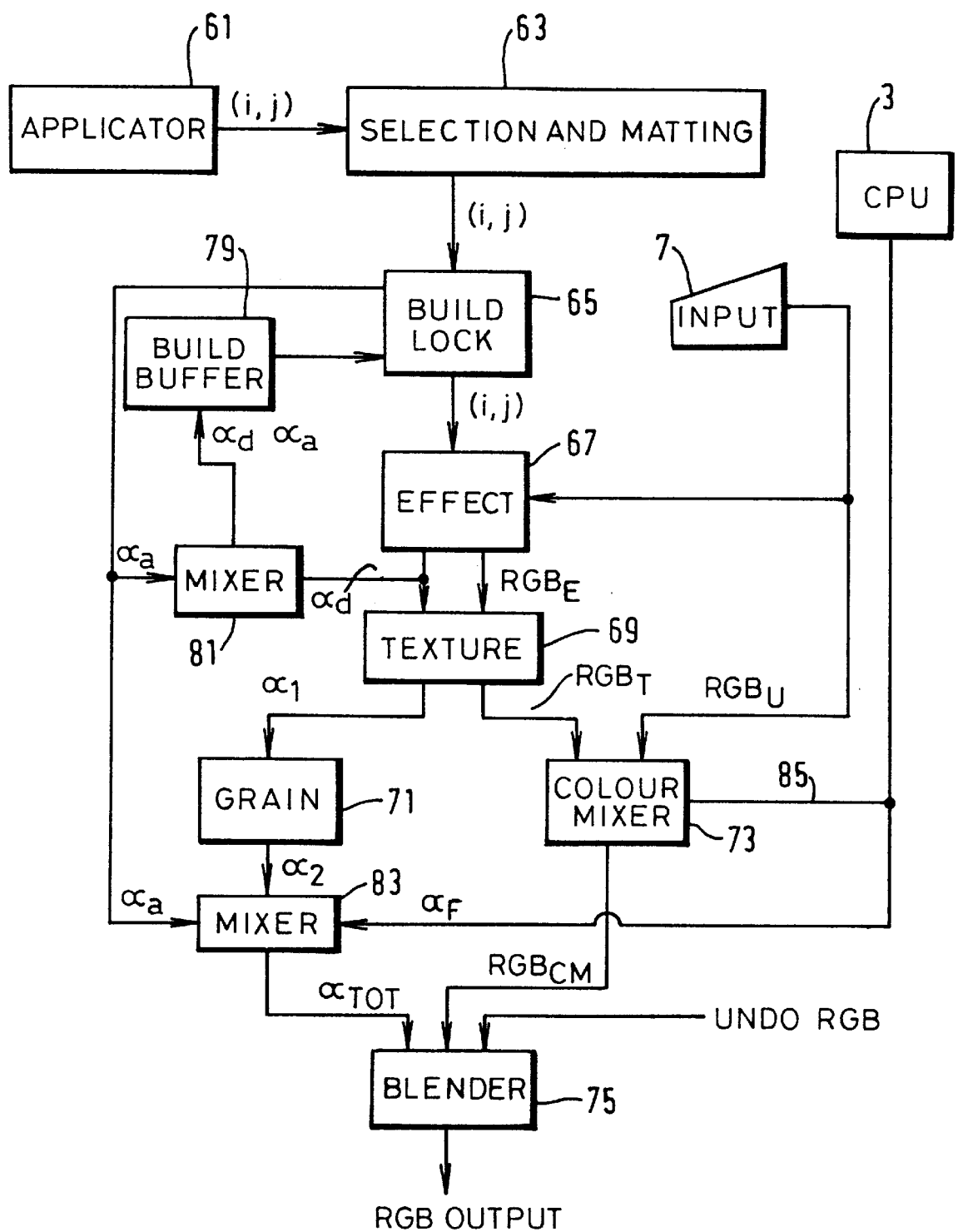
FIG. 6a is a schematic block diagram illustrating the processing steps taken when editing a pixel of the input image using the image editor shown in FIG. 2.

FIG. 6a shows the main components of the image editor 23 and the way in which they operate to control the editing of the colour of a given pixel (i, j) in an editing operation. In this embodiment, the colour of a pixel is defined by a red (R) value, a green (G) value and a blue (B) value, each of which varies from 0 to 1. As shown in FIG. 6a, there is an applicator 61 which determines what pixels are to be edited in response to a user input; a selection and matting unit 63 which, when activated, controls whether or not a current pixel (i, j) is to be excluded from editing, based on a selection made by the user; a build lock unit 65 which controls the application of paint so that it is applied evenly to the part or parts of the image being painted by the user; an effect unit 67 for controlling a type of editing being performed by the user; a texture unit 69 for applying a texture to the pixels being painted; a grain unit 71 for applying a grain to the image; a colour mixer unit 73 for mixing the texture colour with a user selected colour; and a blender unit 75 for blending the final colour with the existing colour of the current pixel (i, j) being painted (the amount of blend is controlled by a "transparency coefficient" or alpha value (α) which varies between 0 and 1 and which is modified by many of the components defined above).

Figure 6B:
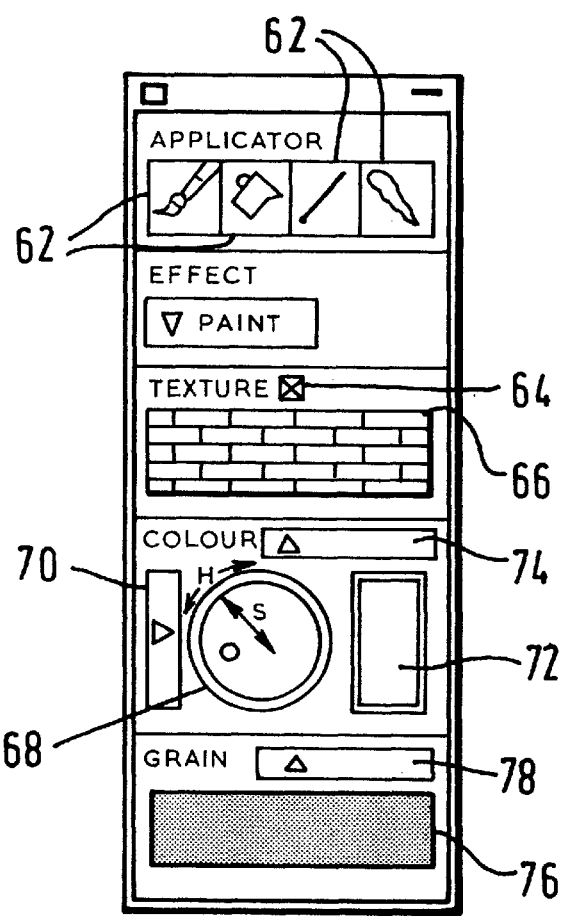
FIG. 6b illustrates a graphical user interface which is used by a user for controlling the editing operation of the image editor shown in FIG. 2.

When the user wishes to edit an image, he must decide which applicator to use; whether or not to use an appropriate selection and/or matting; what kind of edit to make (e.g. add paint); whether or not to add a texture; whether or not to add a grain; and, if appropriate, what colour of paint to add to the image. All these are selected before editing the image using a graphical user interface, such as the one shown in FIG. 6b. As shown in FIG. 6b, in the upper box marked applicator, there are a number of icons 62 for selecting an applicator; below that box there is a box for selecting, from a pull down window (not shown) the effect (in this example the effect chosen is paint); below that box there is a box for texture having a check box 64 for activating and deactivating the texture and a window 66 for displaying the texture which is to be applied; below that box there is a box for choosing the colour to be applied, having a hue (H) and saturation (S) wheel 68, a value (v) slider 70, a display 72 for showing the colour chosen and a slider 74 for controlling the blend in the colour mixer 73 shown in FIG. 6a; below that box there is a box for the grain which has a display 76 for displaying the grain to be applied and a slider 78 for controlling the intensity of the grain applied. Once these parameters of the image editor 23 have been set, the user can edit those parts of the image he wishes to edit under the control of the input device 7.

The operation of each of these main elements of the image editor 23, together with the other elements shown in FIG. 6a, will now be described with reference to FIGS. 7 to 19.

The Applicator

The applicator 61 is the tool chosen by the user for editing the image. The choice of tools available include a brush tool, a line drawing tool, a flood fill tool and a sprinkle tool.

Selecting the brush tool causes the stylus to act like an artists' paint brush, in that by moving the stylus across the digitising tablet causes a corresponding swathe of paint to be applied to the image. In this embodiment, this is achieved by determining a circular pen mask centred at the "stylus down" position (indicated by the user pressing a button on the stylus), rendering the effect for the pixels in the pen mask, and then sampling the next stylus position and repeating until the "stylus up" position (indicated by the user releasing the button). In this way, the painting tracks the movement of the stylus. Gaps may appear in the brush stroke if the stylus is moved too quickly across the digitising tablet relative to the time it takes to process all the pixels within the pen mask. However, this does not cause too many problems as the user can apply a second brush stroke to that part of the image to ensure that the pixels that were missed are edited as desired.

FIG. 7 illustrates the way in which a series of circular pen masks 91a–91g overlap to form a brush stroke. As represented by the gap between pen masks 91e and 91f, gaps may appear in the brush stroke if the stylus is moved too quickly across the digitising tablet. In this embodiment, the user is able to vary the thickness of the brush using a slider (not shown) on the graphical user interface which increases or decreases the diameter 93 of the pen mask accordingly. In this embodiment, the pen mask can have a diameter 93 up to 128 pixels across.

In this embodiment, the user is also able to vary a parameter which corresponds to the hardness of the brush by moving another slider (not shown) on the graphical user interface. A hard brush will apply paint with an even distribution across the diameter 93 of the pen mask, whereas a soft brush will apply more paint in the centre than at the edge. This is achieved by varying the above mentioned transparency coefficient or alpha value for each pixel (which varies from 0 to 1—0 representing complete transparency; 1 representing complete opacity) in the pen mask in dependence upon its distance from the centre of the pen mask. For a hard brush the alpha value associated with each pixel in the pen mask is the same.

Whereas in a soft brush, the alpha value for pixels at the edge of the pen mask will be lower than the alpha value for pixels at the centre of the pen mask.

FIG. 8 shows how the alpha value ($\alpha_p$) varies from the centre of the pen mask to its edge for different levels of brush hardness. These different alpha values are calculated from the following equation:

$$\alpha_p = [(1+\cos[\pi f])/2]^a \quad (5)$$

where f is the distance of the current pixel being processed from the centre of the pen mask as a fraction of the pen mask radius and a represents the hardness of the brush on a scale from 0 (hard) to 1 (soft), which is determined from the position of a slider (not shown) in a graphical user interface.

The line drawing tool allows the user to draw a line from a start point, defined by the user via the keyboard or the stylus, to a similarly defined end point. The parameters of the line which can be varied by the user include thickness, hardness (ie whether its density varies across the width like the soft brush tool) and "wobbliness". FIG. 9 shows three examples of different lines which can be drawn using the line drawing tool. The first line 101 is a relatively thin line having an even density across its width and having no wobble. The second line 103 is thicker than the first line 101 and is denser in the centre of the line than at its longitudinal edges. Again line 103 has no wobble. The third line 105 is thicker than both lines 101 and 103, has an even density across its width and has a predetermined wobble. The wobble is useful for creating rough edges to structures, for example to create a ruinous effect of a building.

The lines are generated by moving a pen mask at one pixel intervals along a computed fractal line. The different thicknesses of line are created by varying the width of the pen mask and the hardness of the line is varied by varying an alpha value associated with each pixel in the pen mask in a similar manner to the way it was varied for the soft brush pen mask described above. The wobble is created by varying the input parameters of the fractal line generator (not shown).

The flood fill tool is well known and used in most commercially available digital paint packages, and fills a user selected area of contiguous pixels.

The sprinkle tool is similar to the flood fill tool, but fills the user selected area using a "digital dissolve" algorithm, which edits pixels within the selected area in a random order. The process can be stopped at any time which can give an aesthetically pleasing speckled appearance to parts of the image.

The Selection and Matting Unit

In this embodiment, since the z-buffer 55 and the material buffer 55 are provided together with the 2-D raster image, a user can choose to apply paint in a number of different ways. For example, the user can apply paint to all objects of a given material (for example all brickwork); to a given plane in the 3-D scene depicted by the 2-D image; or to the surface of any object in the 3-D scene, for example to apply paint to a curved surface in the 3-D scene. These three types of selection will be referred to hereinafter as material matting, plane matting and surface matting respectively.

In addition to these types of selection, in this embodiment, a user can select a polygon in the 2-D image by drawing its outline using the stylus and digitising tablet, or he can select a given colour in the 2-D image using a "magic wand" selection tool. The latter two types of selection are well known in the art of digital paint packages, and will not be described further.

To the user, being able to select a plane, material or surface onto which paint is to be applied offers a significant advantage over existing image editing systems. For example, after selecting a plane in the scene for painting, the user can then use the stylus as a paint brush and apply paint liberally in the general area of the plane, knowing that the selection and matting unit 63 will prevent paint being applied to the image in areas not lying in the selected plane. In order to select a plane onto which paint is to be applied or to select a material of the object to be painted, the user simply uses the stylus to point to and then "click on" the desired plane or material. Therefore, these types of matting are significantly quicker and easier to use than conventional selection tools which require the user to draw a polygon around the area to be painted.

The processing steps involved in the material matting, plane matting and surface matting will now be described with reference to FIG. 10, using, as an example, the brush tool as the applicator 61. If the user decides to restrict the editing of the image by using the matting tool, then in step S1, the user must choose prior to applying any paint to the image, which matting to use—either material matting S3, plane matting S5 or surface matting S7.

If the user chooses material matting S3, then at step S9 the matting unit 63 monitors for the "stylus down" signal generated when the user presses a button on the stylus indicating the beginning of a "brush stroke". The processing remains at step S9 until the stylus down signal is received. Once received, the processing proceeds to step S11 where the matting unit 63 determines the pixel in the 2-D image which corresponds with the current stylus position, and retrieves the material value stored in the material buffer for that pixel. The processing then proceeds to step S13 where the applicator 61 generates the pen mask centred on the pixel corresponding to the current stylus position. Then in step S15, the matting unit 63 ensures that only pixels in the current pen mask which have the same material value as that identified in step S11 are processed further by the image editor 23.

Once all the pixels in the current pen mask have been processed, the processing proceeds to step S17, where the matting unit 63 determines whether or not the "stylus up" signal has been received (generated when the user releases the button on the stylus indicating the end of the "brush stroke"). If the stylus up signal has not been received, then the processing returns to step S13 where the applicator 61 determines the next pen mask, which will be centred on the pixel corresponding to the new stylus position (assuming that the stylus has moved). If on the other hand, the matting unit 63 determines, at step S17, that the stylus up signal has been received then the processing proceeds to step S19 where the matting unit 63 determines whether or not the current editing session has ended (indicated by an appropriate user input via the stylus and/or the keyboard). If it has not ended, then the processing returns to step S9 where the matting unit 63 awaits the application of the next brush stroke. If on the other hand, the current editing session has ended, then the processing proceeds to step S21 where the matting unit 63 is deactivated and the processing ends.

If the user chooses plane matting S5, then at step S23, the matting unit 63 monitors for the stylus down signal indicating the beginning of the brush stroke. The processing remains at step S23 until the stylus down signal is received. Once received, the processing proceeds to step S25, where the matting unit 63 determines the pixel in the 2-D image which corresponds to the current stylus position, and determines the plane in which the object in the 3-D scene represented by that pixel lies. The way in which the matting unit 63 determines the plane of the object will be described later. Once the plane has been determined by the matting unit 63, the processing proceeds to step S27, where the applicator 61 generates the pen mask centred on the pixel corresponding to the current stylus position. Then in step S29, the matting unit 63 ensures that only pixels in the current pen mask which lie in approximately the same plane as that determined in step S25, are processed further by the image editor 23.

Once all the pixels in the current pen mask have been processed, the processing proceeds to step S31, where the matting unit 63 determines whether or not the stylus up signal, indicating the end of the brush stroke, has been received. If it has not been received, then the processing returns to step S27 where the applicator 61 determines the next pen mask which will be centred on the pixel corresponding to the new stylus position. If on the other hand, the matting unit 63 determines, at step S31, that the stylus up signal has been received, then the processing proceeds to step S33 where the matting unit 63 determines whether or not the current editing session has ended. If it has not ended then the processing returns to step S23 where the matting unit 63 awaits the application of the next brush stroke. If on the other hand, the current editing session has ended, then the processing proceeds to step S21, where the matting unit 63 is deactivated and the processing ends.

The way in which the matting unit 63 determines the plane in step S25 will now be described with reference to FIG. 11. In particular, FIG. 11 shows a plane 111, three points a, b and c lying in the plane and the normal vector n which extends from point a in the plane. The equation of the plane 111 is given by the following dot product:

$$r.n=P \qquad (6)$$

where r is an arbitrary point lying in the plane, n is the normal vector and p is a constant. If three points a, b and c which lie in the plane are known, then the normal vector n can be determined by the following sum of vector products:

$$n=(a \times b)+(b \times c)+(c \times a) \qquad (7)$$

and p is given by:

$$p=a.b \times c \qquad (8)$$

When the user presses the button on the stylus when the pointing device is pointing to the desired plane, a pixel (i,j) corresponding to the current position of the stylus is determined. In order to determine the corresponding point in the 3-D scene, the eye-space coordinate for that pixel must be determined using the relationship between eye-space and pixel space defined by equations 2 and 3 above. This gives one point which lies in the plane. To determine the plane equation, the system assumes that the points corresponding to adjacent pixels in the 2-D image lie in the same plane. Therefore, the matting unit 63 determines the eye-space coordinates for pixel (i+1, j) and pixel (i, j+1). The corresponding eye-space coordinates are then determined for these pixels and used to calculate the normal vector n. After simplification, the normal vector is given by:

$$n=(-Z_u d(Z_r-Z),-Z_r d(Z_u-Z),[iZ_u(Z_r-Z)+jZ_r(Z_u-Z)+Z_rZ_u]) \qquad (9)$$

where $Z_u$ is the value in the z-buffer for pixel (i, j+1); $Z_r$ is the value in the z-buffer for pixel (i+1, j); Z is the value in the z-buffer for pixel (i,j); and d is as previously defined. Similarly, the value of the constant p is given by:

$$P=ZZ_rZ_u d \qquad (10)$$

When the matting unit 63 determines, in step S29, whether or not a pixel in the current pen mask lies in this plane it determines the eye-space coordinates ($e_p$) for that pixel and then determines whether or not the dot product $e_p.n$ is equal to P plus or minus some tolerance value. If it is, then the matting unit 63 allows the image editor to edit that pixel and if not, then the matting unit 63 prevents the image editor from editing that pixel.

If, the user chooses surface matting S7, then at step S35 the matting unit 63 monitors for the beginning of a brush stroke (indicated by the stylus down signal) and proceeds to step S37 when it is received. In step S37 the matting unit 63 identifies the plane in which the point indicated by the current position of the stylus lies. The plane equation for this plane is determined in a similar manner to the way in which the plane equation was identified for the plane in step S25. The processing then proceeds to step S39, where the applicator 61 generates the pen mask centred on the pixel corresponding to the current stylus position. Then in step S41, the matting unit 63 ensures that only pixels in the current pen mask which lie in approximately the same plane as that identified in S37 are processed further by the image editor 23.

Once all the pixels in the current pen mask have been processed, the processing proceeds to step S43, where the matting unit 63 determines whether or not the current brush stroke has ended by monitoring for the stylus up signal. If the stylus up signal has not been received then the processing proceeds to step S44 where the matting unit 63 determines whether or not the point indicated by the new position of the stylus lies in approximately the same plane as the point corresponding to the last stylus position. If it does, then the processing proceeds to step S37 where the plane equation is derived for the new stylus position. If, on the other hand, the matting unit 63 determines, in step S44 that the next point does not lie in approximately the same plane, then the processing proceeds to step S39 where the pen mask is generated without recalculating the plane equation for the new point. Furthermore, in this case, the plane identified for the previous point is used in the calculations of step S41 for the pixels in the new pen mask. In this way, provided the user traces along a smooth curved surface (e.g. a curved wall) with the stylus, without crossing over into other planes (e.g. the ground plane), then the paint will be applied to that curved surface only and not to the surrounding pixels.

If the matting unit 63 determines, at step S43, that the stylus up signal has been received, then the processing proceeds to step S45 where the matting unit 63 determines whether or not the current editing session has ended. If it has not ended then the processing returns to step S35 where the matting unit 63 monitors for the beginning of the next brush stroke. If on the other hand, the current editing session has ended, then the processing proceeds to step S21, where the matting unit 63 is deactivated and the processing ends.

The Build Lock Unit

In FIG. 6a, the build lock unit 65 has two functions. The first, which is always operative, is to ensure that during a brush stroke, the pixels which lie in overlapping areas of adjacent pen masks do not have a greater amount of paint applied to them than the non-overlapping areas. The build lock unit 65 addresses this problem by storing, for each pixel in the 2-D image, the amount of paint which has been applied to it so far in the current brush stroke in a buffer (referred to hereinafter as the build buffer), and using this information to limit subsequent painting by the same brush stroke. In particular, if during a brush stroke the build lock unit 65 determines that the current pen mask wishes to apply more paint to a pixel than is currently applied to that pixel, then the current pixel is allowed to be processed again and the amount of paint applied to that pixel by the current pen mask replaces the amount which is currently stored for that pixel in the build buffer. If the amount of paint to be applied to a pixel by a current pen mask is less than the amount of paint which has been applied to it by a previous pen mask of the same brush stroke, then the build lock unit prevents the application of more paint to that pixel. This processing also ensures that if a brush stroke crosses itself the area of overlap will not receive twice the amount of paint than the rest of the brush stroke. FIG. 12 shows an example of a brush stroke 115 which crosses itself. The area of overlap of the brush stroke 115 is indicated by the hatching 117.

The second function of the build lock unit 65 can be activated or deactivated by the user. If activated, it ensures that in a given painting session if different brush strokes overlap, then the amount of paint which is applied in the overlapping areas is not twice that applied in the non-overlapping areas. This offers the advantage that when applying paint to an area of the image, the user does not have to be careful to prevent overlapping brush strokes in order to apply an even amount of paint over the area to be painted. Instead, the user can apply paint freely and liberally to the area using multiple brush strokes. The time taken to paint the area is therefore considerably reduced. The second function of the build lock unit 65 operates by using a second buffer (hereinafter referred to as the build lock buffer) which stores, for each pixel, a value indicative of the cumulative amount of paint which has been applied to that pixel during previous brush strokes of the current painting session.

The way in which the build lock unit 65 operates will now be described in more detail with reference to FIG. 13, using, as an example, the brush tool as the applicator. In step S61, the build lock unit 65 monitors for the beginning of a brush stroke (indicated by the stylus down signal). Once it is received, the processing proceeds to step S63, where the build lock unit 65 determines the pressure which is applied to the stylus and the pen mask for the current stylus position which is generated by the applicator 61. The processing then proceeds to step S65, where the build lock unit 65 determines whether or not all the pixels in the current pen mask have been processed. If they have not, then the processing proceeds to step S67 where the build lock unit 65 determines whether or not the next pixel (i, j) is to be processed (based on the output from the selection and matting unit 63). If the next pixel (i, j) is not to be processed, then the processing returns to step S65. If on the other hand, the next pixel (i, j) is to be processed then the processing proceeds to step S69, where the build lock unit 65 determines the desired alpha value ($\alpha_d$) for that pixel, which will be output by the effect unit 67 when paint is being applied to the image, and the allowed alpha value ($\alpha_a$) for that pixel, which is determined by the build lock unit 65. The desired alpha value ($\alpha_d$) for the current pixel being processed, output by the effect unit 67 is given by:

$$\alpha_d = (\alpha_p) \times (\text{Stylus Pressure}) \times (\alpha_E) \quad (11)$$

Where $\alpha_p$ is the pen mask alpha value for the current pixel and $\alpha_E$ is the alpha value applied by the effect unit 67, which when applying paint has a value of 1. The allowed alpha value for the current pixel being processed, determined by the build lock unit 65, is given by the following equation:

$$\alpha_a = 1 - \text{Build lock} \quad (12)$$

Where build lock is the value in the build lock buffer for to the current pixel (i, j) being processed. As mentioned above, the values in the build lock buffer are dependent upon the total amount of paint which has been applied in the current editing session to the corresponding pixels. At the beginning of a painting session, the value in the build lock buffer for each pixel is zero. Therefore, the allowed alpha value ($\alpha_a$) output by the build lock unit 65 is initially 1. The operation of the build lock buffer will become more apparent from the following description.

Once the values of the allowed alpha and the desired alpha have been calculated in step S69, the processing proceeds to step S71 where the product of these two alpha values is calculated. The processing then proceeds to step S73 which compares the product of alpha values determined in step S71 with the value currently stored in the build buffer for the current pixel being processed. As mentioned above, the build buffer is a buffer which stores the maximum amount of paint which has been applied to that pixel during a current brush stroke. After each brush stroke has been completed, the build buffer is initialised to zero. The function of the build buffer is to take into account the overlapping portions of the pen masks in the brush stroke.

If the product of the desired alpha value ($\alpha_d$) and the allowed alpha value ($\alpha_a$) is less than the corresponding value stored in the build buffer, then this indicates that the current pen mask wants to apply less paint (ie. more transparent paint) than has already been applied to that pixel by previous pen masks of the same brush stroke. In this case, no further processing of the current pixel (i, j) is performed and the processing returns to step S65. If on the other hand the product of the desired alpha value ($\alpha_d$) and the allowed alpha value ($\alpha_a$) is greater than the corresponding value in the build buffer (indicating that the current pen mask wants to apply more paint, i.e. more opaque paint, than has been previously applied to that pixel by previous pen masks of the same brush stroke), then the processing proceeds to step S75 where the current pixel (i, j) is allowed to be processed by the image editor and the corresponding value in the build buffer is set to equal the product of the desired alpha value ($\alpha_d$) and the allowed alpha value ($\alpha_a$), calculated in step S71 above. The processing then returns to step S65.

Once all the pixels in the current pen mask have been processed, the processing proceeds to step S77 where the build lock unit 65 determines if the current brush stroke has ended (indicated by the stylus up signal). If it has not, then the processing returns to step S63 where a new pen mask is generated and a similar procedure is carried out for each pixel in that pen mask. If on the other hand, the current brush stroke has ended, then the processing proceeds to step S79 where the system checks to see if the second function (build lock) of the build lock unit 65 has been activated.

If build lock has been activated, then in step S81, the values in the build buffer are added to the corresponding values in the build lock buffer. By adding the values in the build buffer to the build lock buffer in step S81, during subsequent brush strokes in the same editing session the value of the allowed alpha defined by equation 12 above, will be reduced gradually to 0 as the value in the build lock buffer gradually increases to 1. When the allowed alpha is equal to 0, no paint will be added to that pixel by any subsequent brush strokes made by the user. After step S81, the processing proceeds to step S83 where the values in the build buffer are initialised to zero. If on the other hand, the second function of the build lock unit 65 is not activated, then the processing misses step S81 described above and proceeds to step S83.

After the build buffer has been initialised in step S83, the processing proceeds to step S85 where the build lock unit 65 determines whether or not the current editing session has ended. If it has not, then the processing returns to step S61 where the systems awaits the beginning of the next brush stroke. If on the other hand, the build lock unit 65 determines at step S85 that the current editing session has ended, then the processing proceeds to step S87 where all the values in the build lock buffer are initialised to zero.

The Effect Unit

In addition to being able to add paint to the image, in this embodiment, the user is able i) to add fog to the image which is responsive to the perspective of the 3-D scene using a fog effect; ii) to extend parts of the foreground over the background using a construct effect; iii) to extend any plane within the 3-D scene overwriting any objects regardless of whether they are in the foreground or the background using a destruct effect; and iv) to produce a pencil outline of the image using an edge effect.

Each of these effects will now be described with reference to FIG. 14. Prior to editing the image, the user selects, in step S91, which effect (paint S93, fog S95, construct S97, destruct S99 or edge S101) he wishes to use when editing the image. The default is the paint effect. If the user chooses the paint effect S93, then for each input pixel (i, j), the effect unit 67 outputs the RGB values for pixel (i, j) in the input file which is stored in the mass storage device 13. The alpha value ($\alpha_E$) applied by the effect unit 67 is set to 1 so as not to modify the alpha value determined by the pen mask (and stylus pressure if appropriate). The values in the z-buffer and the material buffer for pixel (i, j) remain unchanged. The processing then proceeds to step S107 where the effect unit 67 determines whether or not the current editing session has ended. If it has not, then the processing of the current pixel (i, j) by the effect unit 67 ends and the colour (RGB) and alpha value output are fed to the texture unit 69 and mixer 81 respectively, as shown in FIG. 6a. If the effect unit 67 determines in step S107, that the current editing session has ended, then, after feeding the determined colour and alpha value to the texture unit 69 and mixer 81 respectively, the effect unit 67 is reset in step S109 to the default effect, i.e. the paint effect, and the processing ends.

If the user selects at step S91 the fog tool, then in step S105 the colour for the current pixel (i, j) being processed is set to white and the alpha value determined by the pen mask is multiplied by $\alpha_E$, which is dependent upon the value of z stored in the z-buffer for the current pixel (i, j) being processed. The way in which $\alpha_E$ is made to vary with z depends upon the type of fog the user wishes to apply. In particular, the user can apply a standard fog to the scene where the amount of fog increases with depth (i.e. increases with increasing z). Alternatively, a ground fog or mist can be applied to the scene by defining a first ground plane and a second plane which lies above and is parallel to the ground plane and then by varying $\alpha_E$ from a high value (approximately 1) at the ground plane to a low value (approximately 0) at the second plane. It is also possible to use the brush tool when applying the fog effect so that only selected areas of the image have the fog. Once the fog has been applied to the current pixel, the processing proceeds to steps S107 and S109 described above.

If at step S91, the user chooses the construct effect S97, then at step S111 the effect tool 67 waits for the user to select a plane in the 3-D scene using the stylus to select a pixel in the 2-D image which represents a point which lies in that plane. Once step S111 has determined the selected pixel, the effect unit 67 determines, in step S113, the plane in which the corresponding point in the 3-D scene lies using the same technique as that used in step S25 of FIG. 10, as described above. The plane equation describing the identified plane is stored by the effect unit 67 and used subsequently during a brush stroke, to extend the selected plane in the brush stroke over the background. In particular, in step S115 the effect unit 67 monitors for the beginning of a brush stroke (indicated by the stylus down signal). When the stylus down signal is detected, processing proceeds to step S117, where the pen mask centred at the current stylus position is determined by the applicator 61. Processing then proceeds to step S119 where the effect unit 67 processes each pixel in the current pen mask using the processing steps shown in FIG. 15.

In particular, with reference to FIG. 15, in step S151 the effect unit 67 determines the z value ($Z_p$) which would project the current pixel (i, j) onto the plane identified in step S113. This is determined from the following equation which is derived from the plane equation:

$$Z_p = P/(i, j, d).n \qquad (13)$$

Then in step S153, the effect unit 67 determines whether $Z_p$ is less than the current value stored in the z-buffer for the current pixel (i, j) being processed. If it is, then this indicates that the current pixel is in the background and should be overwritten by extending the plane identified in step S113. Therefore, in this case, the processing proceeds to step S155 where i) the RGB values for the current pixel (i, j) are set to equal the corresponding RGB values in the input image (which is stored in the mass storage device 13); ii) the alpha value applied by the effect unit 67 ($\alpha_E$) is set to 1; iii) the z value in the z-buffer for the current pixel (i, j) is set to equal $Z_p$; and iv) the material value for the current pixel (i, j) is set to equal that of the pixel selected in step S111. If on the other hand, at step S153 the effect unit 67 determines that $Z_p$ is greater than the Z value stored in the z-buffer for the current pixel (i, j) (indicating that the current pixel is in front of the plane being extended), then the current pixel is not edited by the effect unit 67.

Returning to FIG. 14, once each pixel in the current pen mask has been processed in step S119 using the steps shown in FIG. 15, the processing proceeds to step S121, where the effect unit 67 determines whether or not the current brush stroke has ended (indicated by the stylus up signal). If it has not ended, then the processing returns to step S117 where the next pen mask is determined and a similar procedure is performed for the pixels therein. If on the other hand the current brush stroke has ended, then the processing proceeds to steps S107 and S109 described above.

If at step S91 the user selects the destruct effect S99, then at step S123 the effect 67 waits for the user to select a plane in the 3-D scene using the stylus to select a pixel in the 2-D image which represents a point which lies in that plane. Once step S123 has determined the selected pixel, the effect unit 67 determines, in step S125, the plane in which the corresponding point in the 3-D scene lies using the same technique as that used in step S25 shown in FIG. 10 and described above. The plane equation describing the identified plane is stored by the effect unit 67 and used subsequently, during a brush stroke, to extend the selected plane over the foreground and the background. In particular, in step S127, the effect unit 67 monitors for the beginning of a brush stroke (indicated by the stylus down signal). When the stylus down signal is detected, processing proceeds to step S129 where the pen mask centred at the current stylus position is determined by the applicator 61. The processing then proceeds to step S131 where the effect unit 67 processes each pixel in the current pen mask using the processing steps shown in FIG. 16.

In particular, with reference to FIG. 16, in step S157, the effect unit 67 determines the z value ($Z_p$) which would project the current pixel (i, j) onto the plane identified in step S125. $Z_p$ is determined in the same way that it was determined in step S153, using equation 13 given above. The processing then proceeds to step S159, where i) the RGB values for the current pixel (i, j) are set to equal the corresponding RGB values in the input image (which is stored in the mass storage device 13); ii) $\alpha_E$ is set to 1; iii) the value in the z-buffer for the current pixel (i, j) being processed is set to equal $Z_p$; and iv) the material value for the current pixel (i, j) being processed is set to equal that of the pixel selected in step S123.

Returning to FIG. 14, once each pixel in the current pen mask has been processed in step S131 using the steps shown in FIG. 16, the processing proceeds to step S133, where the effect unit 67 determines whether or not the current brush stroke has ended (indicated by the stylus up signal). If it has not ended, then the processing returns to step S129, where the next pen mask is determined and a similar processing occurs for the pixels thereof. If on the other hand, the current brush stroke has ended, then the processing proceeds to steps S107 and S109 described above.

If at step S91, the user selects the edge effect S101, then in step S135 the effect unit 67 i) sets the RGB values for the current pixel (i, j) being processed to equal the corresponding RGB values in the input image (which is stored in the mass storage device 13); ii) varies the alpha value for the current pixel (i, j) being processed by making $\alpha_E$ dependent upon the rate of change of the rate of change of z in the z-buffer, and optionally also dependent upon the stylus pressure; and iv) leaves the z and material values for the current pixel (i, j) being processed unchanged. After step S135, the processing proceeds to steps S107 and S109 described above.

As those skilled in the art will realise, at edges of surfaces in the 3-D scene, the rate of change of the z values stored in the z-buffer for the pixels which represent the edge varies abruptly. This is especially the case at the edge between a surface in the foreground and the background. Therefore, by setting $\alpha_E$ to be approximately 0 when there is little change in the rate of change of z values in the z-buffer, and by setting $\alpha_E$ to be approximately 1 when the rate of change of the z values in the z-buffer varies abruptly, then only the edges of the scene will be drawn in the output image. This results in a pencil outline of the 3-D scene. Furthermore, if the stylus pressure is also used to modify $\alpha_E$, then the pencil outline will be emphasised at those parts where the user applies more pressure to the stylus.

Texture

The RGB values and alpha value output by the effect unit 67 are applied to the texture unit 69 which, when activated, applies a texture to the parts of the image being edited. This is achieved by changing the RGB values for each pixel in dependence upon the chosen texture, which can be drawn or painted by hand, and then scanned into the computer. Alternatively, the textures can be created from photographs of real materials which are subsequently scanned into the computer. Alternatively still, the texture could be a procedural kind of texture which is a computer generated texture determined from a mathematical algorithm.

The texture is made up of individual elements called texels, residing in a two-dimensional texture coordinate space. The texture may represent, for example, a colour, transparency or shadow profile etc. To apply the texture to the image to be edited, the coordinates of a display pixel lying within an area representing the object are mapped into texture coordinate space, to identify a corresponding texel or texels. The value for the pixel is then derived from the value of the texel(s).

FIG. 17 schematically illustrates an example of a texture pattern (in this case, representing brickwork) which may be applied to surfaces within the 3-D scene. The texture is defined by a grid of texels, indexed by (u, v) in the range (0, 0) to (umax-1, vmax-1). The texture pattern is repeated continuously, to get the effect of tiling, such that texel coordinates outside the above range are treated modulo the bound. When the texture is being applied to a surface in the 3-D scene, an anchor point defined by texel coordinates ($u_c$, $v_c$) is placed at the selected point on the surface and a reference frame is constructed in order to orient the texture on the object's surface.

The way in which the texture unit 69 applies texture to the image will now be briefly described with reference to FIG. 18. In step S161 the texture unit 69 determines whether or not the user has decided to apply a texture to the image. If not then processing by the texture unit 69 is not performed and the RGB values and alpha value output by the texture unit 69 are the same as those output by the effect unit 67. If on the other hand the user has activated the texture unit 69, then processing proceeds to step S163, where the texture unit converts the current pixel (i, j) being processed into eye-space coordinates using the relationship defined by equations 2 and 3 given above. The processing then proceeds to step S165, where the eye-space coordinate is perspective mapped into the reference frame described above in which the texture lies, to determine the corresponding texture coordinates (u, v) for that pixel. The RGB values and the alpha value ($\alpha_T$) applied by the texture unit (69) for the current pixel (i, j) being processed are then determined, in step S167, from the determined texture coordinates. The alpha value ($\alpha_1$) output by the texture unit 69 is equal to the product of the alpha value ($\alpha_d$) output by the effect unit 67 and $\alpha_T$. The RGB values and alpha value output by the texture unit 69 are then passed to the colour mixer 73 and grain unit 71 respectively. The processing steps involved in steps S165 and S167 are well known to those skilled in the art and are described, for example, from page 741 to page 744 of Computer Graphics Principles and Practice by Foley, Van Dam, et al, second edition, Addison Wesley, Reading, Mass., USA and will not be described further.

In addition to being able to apply textures to the 2-D image in perspective, prestored cut-outs of entourage such as statues and trees and the like, can also be added by the user in proper perspective using the image editor 23. Typically, the cut-outs are generated from a scanned drawing and are stored in a library. A cut-out is like a texture in that pixels of the cut-out are defined by RGB values and an alpha value. When the cut-out is being added to the 3-D scene, the texture unit inspects the z-buffer, and scales the cut-out according to perspective. Furthermore, when the cut-out is placed behind objects in the foreground which partially mask the cut-out, the z-buffer is used to calculate which parts are visible and which are not. When a cut-out is added, not only does it modify the visual aspect of the 3-D scene, it also modifies the z and material buffers of the output file. This allows a second cut-out to be partially masked by the first, and the surface of the cut-out to receive further treatment, such as the addition of a further texture.

The Colour Mixer

The colour output ($RGB_T$) by the texture unit 69 is fed into the colour mixer 73 together with the colour ($RGB_u$) set by the user using the colour wheel 68 and value slider 70 shown in the user interface shown in FIG. 6b. The colour mixer 73 outputs a colour ($RGB_{cm}$) which is a linear blend of the two input colours. The amount of blend is determined by a control signal 85 from the CPU 3 which is dependent upon the position of the slider 74 in the user interface shown in FIG. 6b. When slider 74 is on the left hand side the colour output by the colour mixer 73 is dominated by $RGB_T$, whereas if the slider is on the right hand side, the colour output by the colour mixer 73 is dominated by $RGB_u$. The relationship between the colour output by the colour mixer 73 and the two input colours is given by the following equation:

$$RGB_{CM}=(1-K)RGB_T+KRGB_U \qquad (14)$$

where K is dependent upon the position of slider 74 and has a value of 0 when the slider 74 is at the left extreme and a value of 1 when the slider 74 is at the right extreme.

The Grain Unit

The alpha value ($\alpha_1$) output by the texture unit 69 is modified by the grain unit 71 when activated. The grain unit 71 is used to give a chalky or grainy texture to the final image. The grain unit 71 stores a 2-D alpha texture from which an appropriate alpha value ($\alpha_G$) is determined for the current pixel (i, j) being processed and used to scale the composite alpha ($\alpha_1$) obtained so far for that pixel. The alpha value ($\alpha_2$) output by the grain unit 71 is therefore given by:

$$\alpha_2=\alpha_1\cdot\alpha_G=\alpha_P\cdot\alpha_E\cdot\alpha_T\cdot\alpha_G\cdot\text{STYLUS PRESSURE} \qquad (15)$$

$\alpha_2$ is then multiplied by the allowed alpha ($\alpha_a$) determined by the build lock unit 65 and a preset alpha value ($\alpha_F$) from the CPU 3 in mixer 83, to give the total alpha value ($\alpha_{TOT}$) for the current pixel (i, j) being processed. The preset alpha value ($\alpha_F$) is set by the user prior to the beginning of the current editing session and controls how much of the effect (e.g. paint or fog) is blended with the existing colour. The total alpha value ($\alpha_{TOT}$) is then input to the blender 75 and used to control the blending of the edited colour (output by the colour mixer) with the colour which is already being displayed on the display 11 for the current pixel (i, j).

The Blender

The blender unit 75 takes the colour ($RGB_{cm}$) output by the colour mixer 73 and mixes it with the colour ($RGB_{EXISTING}$) which is currently being displayed for the current pixel (i, j) being processed. As mentioned above, the amount of blend is determined by the total alpha value ($\alpha_{TOT}$) output by the mixer 83. Also input to the blender 75 is an undo colour ($RGB_{UNDO}$) which corresponds to the colour of the original input image for the current pixel (i, j) being processed. If the undo is selected by the user, then the colour of the input image for all pixels which were edited in the last editing session are retrieved from the mass storage device 13 and used to restore the original colour of the edited pixels.

The operation of the blender 75 will now be described in more detail with reference to FIG. 19. Prior to editing the image, the user chooses, in step S181, via a graphical user interface, a type of blending which is to be used. The choice includes a paint blend S183, an ink blend S185, a darken blend S187, a lighten blend S189 or a tint blend S191. If the user chooses a paint blend S183, then the blender 75 performs, in step S193, a linear blend between the edited colour (ie. that output by the colour mixer 73) with the existing output colour in dependence upon the total alpha value ($\alpha_{TOT}$) output by the mixer 83, using the following equation:

$$RGB_{OUTPUT}=(1-\alpha_{TOT})RGB_{EXISTING}+\alpha_{TOT}RGB_{CM} \qquad (16)$$

If in step S181 the user chooses to use an ink blend S185, then as indicated in step S195, the blender 75 linearly blends the edited colour output by the colour mixer 73 with white, in dependence upon the total alpha value ($\alpha_{TOT}$) output by mixer 83 and then multiplies the result with the existing output colour, ie. the output colour from the blender 75 for an ink blend is given by:

$$RGB_{OUTPUT}=[(1-\alpha_{TOT})RGB_{WHITE}+\alpha_{TOT}RGB_{CM}]RGB_{EXISTING} \qquad (17)$$

If in step S181 the user selects a darken blend (step S187), then in step S197 the blender 75 determines if the edited colour "value" is less than the existing output colour "value". In this embodiment, the "value" of a colour is the maximum of the R, G and B values. The value is therefore, a measure of the brightness of the pixel. If the edited colour value is greater than the existing output colour value (indicating that the edited colour is brighter than the existing colour), then the output RGB values are not changed, as to do so would make the image lighter and not darker as desired. If, on the other hand, the edited colour value is less than the existing output colour value (indicating that the edited colour is darker than the current colour) then the processing proceeds to step S199, where a linear blend between the edited colour output by the colour mixer 73 and the existing output colour is performed, in dependence upon the total alpha value ($\alpha_{TOT}$) output by mixer 83, using equation 16 above.

If at step S181, the user chooses to use the lighten blend S189, then the blender 75 only modifies the output colour for the current pixel (i, j) if the edited colour is lighter than the colour already being displayed at that pixel. Therefore, in step S201, the blender 75 determines whether the edited colour value is greater than the existing output colour value. If it is not then the edited colour is darker than the existing colour and therefore the blender does not alter the colour of the pixel currently being processed. On the other hand, if at step S201 the blender 75 determines that the edited colour value is greater than the existing output colour value, then the processing proceeds to step S203 where the blender 75 performs a linear blend of the edited colour with the existing output colour in dependence upon the total alpha value ($\alpha_{TOT}$) using equation 16 above.

If at step S181, the user decides to apply the tint blend S191, then in step S205 the blender 75 converts the edited colour (RGB values) output by the colour mixer 73 and the existing colour (RGB values) for the current pixel (i, j) being processed into corresponding values of hue (H), saturation (S) and value (V). Then in step S207, the blender 75 performs a linear blend between the edited hue and saturation values with the existing hue and saturation values in dependence upon the total alpha value ($\alpha_{TOT}$) in a similar manner to the linear blend performed in step S193 described above. The processing then proceeds to step S208, where the blended hue and saturation values and the value (v) for the existing colour, are converted back into RGB values which are used as the output of the blender 75.

As those skilled in the art will appreciate, the user is able to select a number of different combinations of the applicator, matting, effect, texture, grain, blend etc., thereby providing a paint package which can perform a number of different 3-D painting operations. For example, by choosing a combination of the fog effect and a brickwork texture, the user can use the matting tool to apply the brickwork texture to the surface of a wall which extends into the distance in the 3-D scene. The result is a brickwork texture which is applied to the surface of the wall and which fades out as the wall disappears into the background.

An example of the way in which the paint system described above is used to edit a rendered image output by the renderer 21 will now be described with reference to FIGS. 20 to 24.

FIG. 20 illustrates an example of a rendered 2-D image of a 3-D scene from a given viewpoint output by the renderer 21. As can be seen from FIG. 20, the renderer 21 has determined which surfaces of the 3-D model are visible from the viewpoint, and has applied shadow to the input image which would result from a light source lighting the 3-D scene from the left hand side. No texture or other effects have been added to the image by the renderer 21.

FIG. 21 shows the rendered 2-D image shown in FIG. 20 during an editing session. As shown in FIG. 21, paint has been applied to the background in brush strokes generally indicated by reference numeral 131. The paint has been applied to the background using the plane matting feature described above, where the selected plane is the background. Therefore, when the brush stroke 131 has passed over objects in the foreground (for example the pillars of the gatepost) paint has not been applied thereto. As will be appreciated by those skilled in the art, this is a significant improvement over prior art digital paint systems where a user has to identify areas to be painted, or areas not to be painted, by drawing the outline of the area using a polygon selection tool. As can also be seen from FIG. 21, the user has applied two different intensities of paint to the surface 133 of pillar 135. In particular, in an upper portion of surface 133, a light intensity paint has been applied, whereas in the lower portion a lower intensity paint has been applied. To ensure that paint is not applied to the wrong surface, the plane matting tool was used to select the plane of the surface 133 for painting. The paint was then applied to the image using the paint brush tool.

FIG. 22 shows the image after further editing by the image editor 23. In particular, a brick texture has been applied, in proper perspective, to the surface of some of the walls of the gatepost and a grass texture has been applied to the ground plane. As can be seen in FIG. 22, two different types of brick texture have been used on the surface of the gatepost. This is achieved by simply selecting the different textures during a single editing session and using the build lock facility which prevents previously painted pixels from being overwritten. Such a texturing technique would be difficult to parameterise for a conventional computer rendering algorithm.

FIG. 23 shows the final edited image, where all the visible walls of the gatepost have had a brick texture applied to them; the main pillars of the gatepost have had a statue placed on top of them; trees have been added to the image in the background behind the gatepost and a fog has been added to the image to blur out some of the background, giving an added feel of depth to the image.

Once the user has finished processing the image, he may store it on a computer readable medium, such as the floppy disk 17, or he may transmit it over a datalink to other users. Alternatively still, the edited image may be printed via a printer (not shown), such as a laser printer, to provide a hard copy.

FIG. 24 shows a pencil outline drawing of an image similar to the one shown in FIG. 23 which was obtained using the edge tool described above with reference to FIG. 14.

As those skilled in the art will appreciate, a digital paint system has been described which can apply paint, textures, and other effects in perspective during an editing operation thereof by a user. Therefore, the digital paint system of the present embodiment allows users to paint and edit images in a similar manner to the way in which artists and designers traditionally edited images by hand. This is a major advantage over the prior art techniques which require the user to input an abstract set of numerical input parameters into a deterministic batch rendering algorithm which provides no continuous feedback to the user during the rendering process. The paint system of the present embodiment has the further advantage that it computes the perspective of each edited pixel automatically as it is being edited on screen. Therefore, the user does not have to have an "eye" for such details.

Although the majority of a digital paint system has been described, it will be apparent to those skilled in the art that some of the features described are not essential to all aspects of the present invention and should not be construed as limiting in this way. For example, the provision of a material buffer from the renderer 21 is not essential for being able to apply paint and texture and the like to the image in proper perspective. The material buffer is provided to give the user increased flexibility with the selection and matting unit 63. Furthermore, it will be appreciated by those skilled in the art that the material matting described with reference to FIG. 10 could be applied in other image processing systems where the Z-buffer is not provided or known. In this case, paint could not be applied to objects in the 3-D scene in dependence upon the depth of those objects relative to the viewpoint, however, the selection and matting unit 63 could still be used to select objects of a given material in the 2-D image for applying texture or paint or other effects.

The above embodiment could be modified to store, in addition to the z-buffer and the material buffer for each input 2-D image, a surface normal or plane equation buffer as well. Such a plane buffer would store the surface normal or plane equation for each pixel, thereby significantly reducing the processing required to determine the plane equations. This would significantly speed up the processing of the image editor when plane matting or surface matting are performed.

Although in the above embodiment, a depth value and a material value have been stored for each pixel in the 2-D image, a single value may be used for a group of, for example, four or eight pixels. This would reduce the amount of memory required to store these buffers.

Although the destruct effect described with reference to FIG. 14, extends a plane within the 3-D scene and overwrites objects which are located both in the foreground and in the background, it will be evident to those skilled in the art that the destruct effect could be modified so that it only overwrites objects in the foreground and not in the background.

As those skilled in the art will realise, the second function of the buildlock unit 65 (which prevents a paint doubling effect in overlapping areas of different brush strokes) could be used in a conventional image editing apparatus which does not use depth values or material values to vary an editing operation. For example, the buildlock feature described above could be used in Photoshop (mentioned above) or in other similar image editing apparatus.

Although the above embodiment describes the plane matting, surface matting and material matting as three separate and optional matting tools, this embodiment could be amended so that a combination of matting effects could be selected. For example, the above embodiment could be amended so that a user can choose to apply paint only to pixels which lie in a given plane and which have a given material value. Such an alternative embodiment would provide increased user flexibility.

Since the material buffer and the z-buffer of the 2-D image are available for use by the image editor 23, the image editor 23 could be used to "re-render" the input image for different lighting, using Phong shading (described in "Illumination for Computer Generated Pictures", by Bui-Tuong, (1975), CACM, pages 311–317).

Although the input (EPIX) file in the embodiment described was produced by the renderer 21, it could be produced from a stereoscopic camera which determines the depth values for each pixel in the image by suitably processing the images obtained from the two lens systems.

Although a pressure sensitive stylus and digitizing tablet was used as the pointing device for designating areas of the 2-D image to be edited, this is not essential, other pointing devices or input devices may be used. Furthermore, the stylus does not have to be pressure sensitive, in which case, the value of the variable "stylus pressure" used in equations 11 and 15 would be set to the value 1.

Second Embodiment

A second embodiment of the present invention will now be described with reference to FIGS. 25 to 27. The digital paint system of the second embodiment differs from the digital paint system of the first embodiment in the functional ability of the texture unit 69 shown in FIG. 6a. In particular, the texture unit of the second embodiment has the additional ability to be able to apply a variable texture to the 2-D image in dependence upon the tonality of the original. The intended use of this variable texture is to apply hatching of variable density—more lines or thicker ones in dark areas, fewer in the light areas. In other words, in light parts of the image the hatching should be less noticeable than in the darker regions of the image. The way in which this is achieved will now be described in more detail.

FIG. 25 shows a sample of hatching lines which can be applied to an image. This hatching is considered to be a texture which is applied by the texture unit 69. The hatching texture is defined by grid of texels, each texel being defined by a colour (RGB values) and an associated transparency or alpha value ($\alpha_H$). In this embodiment, the colour of each texel is set to be the same value, i.e. the desired colour of the hatching lines, and the alpha value of each texel is varied to produce the hatching lines. In particular, the alpha value for all texels in a given row (i.e. for a given v) are set to be the same. Whereas the alpha value for a column of texels is set to vary in a sinusoidal manner as illustrated in FIG. 26. Each of the peaks of the sinusoidal waveform shown in FIG. 26 corresponds with one of the horizontal hatch lines shown in FIG. 25.

To generate the hatching lines with varying thicknesses, a threshold value (Th) for a current pixel being processed is determined based on the brightness of that pixel and used to control the alpha value ($\alpha_T$) applied by the texture unit 69 shown in FIG. 6a. In particular, if it is determined that the alpha value ($\alpha_H$) of the hatching texture for the current pixel being processed is greater than the set threshold value (Th), then $\alpha_T$ is set equal to 1. If on the other hand the alpha value ($\alpha_H$) for the hatching texture for the current pixel being processed is less than the set threshold value (Th), then $\alpha_T$ is set equal to 0. Therefore, as the threshold (Th) increases (indicative of a light area of the 2-D image) so the width W of the hatching lines applied decreases. Similarly, as the threshold (Th) decreases (indicative of a dark area of the 2-D image) so the width W of the hatching lines increases. FIG. 27 shows the result of applying this variable hatching to part of the 2-D render shown in FIG. 23. As can be seen from FIG. 27, the hatching lines are thicker and merge into each other at dark points in the image, whereas the hatching lines disappear in the bright parts of the image.

A modification to this embodiment is to change the orientation of the hatch lines in dependence upon the gradient of the brightness of the original image. This results in hatching lines which follow the curved surfaces in the input image.

Although the variable texture feature of the second embodiment has been described in use with a digital paint system according to the first embodiment, it will be apparent to those skilled in the art that this aspect of varying an applied texture in dependence upon the tonality of the image being edited can be used in existing paint packages, such as Photoshop mentioned above or in conventional computer renderers.

The present invention is not intended to be limited by the exemplary embodiments described above, and various other modifications and embodiments will be apparent to those skilled in the art.

What is claimed is:

1. A computer based interactive image editing apparatus comprising:
   a receiving circuit for receiving (i) a two dimensional (2D) image of a rendered three dimensional (3D) scene viewed from a given viewpoint, the 2D image comprising an array of pixels which represents the appearance of said 3D scene from said viewpoint; and (ii) depth values for the pixels within the 2D image, which depth values represent the distance between said viewpoint and points in the 3D scene represented by the pixels;
   an output circuit for outputting the 2D image to a display for displaying the 2D image to a user;
   a designator, responsive to an input from a user, for designating pixels of the 2D image which represent at least one object within the 3D scene whose appearance within the 2D image is to be edited; and
   an image editor for modifying the designated pixels in dependence upon a user selected editing operation and upon the depth values associated with the designated pixels, so as to modify the appearance, within the 2D image, of the at least one object represented by the designated pixels.

2. An apparatus according to claim 1, wherein said designator is operable to designate said pixels in dependence upon the depth values associated therewith.

3. An apparatus according to claim 2, wherein said designator is operable to designate pixels corresponding to a plane in the 3D scene for modification by said image editor.

4. An apparatus according to claim 2, wherein said designator is operable to designate pixels corresponding to a surface of an object in the 3D scene for modification by said image editor.

5. An apparatus according to claim 1, wherein said receiving circuit is operable to receive material values for the pixels within the 2D image, which material values are indicative of the material of an object in the 3D scene represented by said pixels, and wherein said designator is operable to designate said designated pixels in dependence upon said received material values.

6. An apparatus according to claim 1, wherein said user selected editing operation is the application of paint to the designated pixels.

7. An apparatus according to claim 6, wherein said image editor is operable to vary the transparency of the paint applied to a designated pixel in dependence upon the depth value for that pixel.

8. An apparatus according to claim 1, wherein said user selected editing operation comprises the application of a selected texture to the surface of said at least one object in the 3D scene represented by the designated pixels.

9. An apparatus according to claim 8, wherein said image editor is operable to vary the application of said texture to the surface of the at least one object represented by the designated pixels, in dependence upon the depth values for the designated pixels.

10. An apparatus according to claim 8, wherein said image editor is operable to modify the designated pixels in order to vary the texture applied to said at least one object in dependence upon the variation of tonality of the designated pixels.

11. An apparatus according to claim 10, wherein said texture is a hatching texture and wherein said image editor is operable to apply thinner hatching lines to lighter parts of the 2D image and to apply thicker hatching lines to darker areas of the 2D image.

12. An apparatus according to claim 1, wherein said user selected editing operation comprises the extension of a selected plane in the background of said 3D scene over the foreground of said 3D scene.

13. An apparatus according to claim 1, wherein said user selected editing operation comprises the extension of a selected plane in the foreground of said 3D scene over the background of said 3D scene.

14. An apparatus according to claim 1, wherein said user selected editing operation comprises the extension of a selected plane over objects in the foreground and the background of said 3D scene.

15. An apparatus according to claim 1, further comprising said display for displaying said 2D image during said image editing operation.

16. An apparatus according to claim 15, further comprising a user operable pointing device for controlling said designator.

17. An apparatus according to claim 16, wherein said designator is operable to designate a swathe of pixels in the 2D image in response to a corresponding movement of said pointing device across a corresponding part of the 2D image displayed on the display.

18. An apparatus according to claim 17, wherein said user selected editing operation comprises the addition of semi-transparent paint to the 2D image, and wherein said image editor is operable to inhibit the application of paint to pixels in the current swathe being painted which have already been painted during the painting of a previous swathe in the current editing session.

19. An apparatus according to claim 1, further comprising a mass storage device for storing said 2D image and said depth values before an image editing operation and a working memory for storing said 2D image and said depth values during an image editing operation.

20. An apparatus according to claim 19, further comprising circuitry for storing an edited 2D image in said mass storage device for subsequent processing or editing operations.

21. A computer based interactive image editing method comprising the steps of:
   receiving (i) a two-dimensional (2D) image of a rendered three-dimensional (3D) scene viewed from a given viewpoint, the 2D image comprising an array of pixels which represents the appearance of said 3D scene from said viewpoint; and (ii) depth values for the pixels within the 2D image, which depth values represent the distance between said viewpoint and points in the 3D scene represented by the pixels;
   displaying said 2D image to a user;
   receiving an input from the user identifying at least one object within the 3D scene whose appearance within the 2D image is to be edited and identifying an editing operation to be performed;
   designating, in response to said user input, pixels of the 2D image to be edited; and
   modifying the designated pixels in dependence upon the user selected editing operation and upon the depth values associated with the designated pixels, so as to modify the appearance, within the 2D image, of the at least one object represented by the designated pixels.

22. A method according to claim 21, wherein said designating step designates said pixels in dependence upon the depth values associated therewith.

23. A method according to claim 22, wherein said designating step designates pixels corresponding to a plane in the 3D scene for modification in said modifying step.

24. A method according to claim 22, wherein said designating step designates pixels corresponding to a surface of an object in the 3D scene for modification in said modifying step.

25. A method according to claim 21, wherein said receiving step receives material values for the pixels within the 2D image, which material values are indicative of the material of an object in the 3D scene represented by said pixels, and wherein said designating step designates said designated pixels in dependence upon said received material values.

26. A method according to claim 21, wherein said user selected editing operation is the application of paint to the designated pixels.

27. A method according to claim 26, wherein said modifying step varies the transparency of the paint applied to a designated pixel in dependence upon the depth value stored for that pixel.

28. A method according to claim 21, wherein said user selected editing operation comprises the application of a selected texture to the surface of said at least one object in the 3D scene represented by the designated pixels.

29. A method according to claim 28, wherein said modifying step modifies the designated pixels in order to vary the application of said texture to the surface of the at least one object represented by the designated pixels, in dependence upon the depth values for the designated pixels.

30. A method according to claim 28, wherein said modifying step modifies the designated pixels in order to vary the texture applied to said at least one object in dependence upon the variation of tonality of the designated pixels.

31. A method according to claim 30, wherein said texture is a hatching texture and wherein said modifying step applies thinner hatching lines to lighter parts of the 2D image and thicker hatching lines to darker areas of the 2D image.

32. A method according to claim 21, wherein said user selected editing operation comprises the extension of a selected plane in the background of said 3D scene over the foreground of said 3D scene.

33. A method according to claim 21, wherein said user selected editing operation comprises the extension of a selected plane in the foreground of said 3D scene over the background of said 3D scene.

34. A method according to claim 21, wherein said user selected editing operation comprises the extension of a selected plane over objects in the foreground and the background of said 3D scene.

35. A method according to claim 21, wherein said user uses a pointing device to provide said input.

36. A method according to claim 35, wherein said designating step designates a swathe of pixels in the 2D image in response to a corresponding movement of said pointing device across a corresponding part of the displayed 2D image.

37. A method according to claim 36, wherein said user selected editing operation comprises the addition of semi-transparent paint to the 2D image, and wherein said modifying step inhibits the application of paint to pixels in the current swathe being painted which have already been painted during the painting of a previous swathe in the current editing session.

38. A method according to claim 21, further comprising the steps of storing said 2D image and said depth values in a mass storage device prior to performing an image editing operation and storing said 2D image and said depth values in a working memory during an image editing operation.

39. A method according to claim 38, wherein after said modifying step, the method further comprises the step of storing the edited image in said mass storage device for subsequent processing or subsequent editing operations.

40. A computer-readable memory medium storing computer-readable process steps to perform an interactive computer based image editing method, the computer-readable process steps comprising steps for:

receiving (i) a two-dimensional (2D) image of a rendered three-dimensional (3D) scene viewed from a given viewpoint, the 2D image comprising an array of pixels which represents the appearance of said 3D scene from said viewpoint; and (ii) depth values for the pixels within the 2D image, which depth values represent the distance between said viewpoint and points in the 3D scene represented by the pixels;

displaying said 2D image to a user;

receiving an input from the user identifying at least one object within the 3D scene whose appearance within the 2D image is to be edited and identifying an editing operation to be performed;

designating, in response to said user input, pixels of the 2D image to be edited; and modifying the designated pixels in dependence upon the user selected editing operation and upon the depth values associated with the designated pixels, so as to modify the appearance, within the 2D image, of the at least one object represented by the designated pixels.

41. A computer-readable medium according to claim 40, wherein said designating step designates said pixels in dependence upon the depth values associated therewith.

42. A computer-readable medium according to claim 41, wherein said designating step designates pixels corresponding to a plane in the 3D scene for modification in said modifying step.

43. A computer-readable medium according to claim 41, wherein said designating step designates pixels corresponding to a surface of an object in the 3D scene for modification in said modifying step.

44. A computer-readable medium according to claim 40, wherein said receiving step receives material values for the pixels within the 2D image, which material values are indicative of the material of an object in the 3D scene represented by said pixels, and wherein said designating step designates pixels in dependence upon said received material values.

45. A computer-readable medium according to claim 40, wherein said user selected editing operation is the application of paint to the designated pixels.

46. A computer-readable medium according to claim 45, wherein said modifying step varies the transparency of the paint applied to a designated pixel in dependence upon the depth value stored for that pixel.

47. A computer-readable medium according to claim 40, wherein said user selected editing operation comprises the application of a selected texture to the surface of said at least one object in the 3D scene represented by the designated pixels.

48. A computer-readable medium according to claim 47, wherein said modifying step modifies the designated pixels in order to vary the application of said texture to the surface of at least one object represented by the designated pixels, in dependence upon the depth values for the designated pixels.

49. A computer-readable medium according to claim 47, wherein said modifying step modifies the designated pixels in order to vary the texture applied to said at least one object in dependence upon the variation of tonality of the designated pixels.

50. A computer-readable medium according to claim 49, wherein said texture is a hatching texture and wherein said modifying step applies thinner hatching lines to lighter parts of the 2D image and thicker hatching lines to darker areas of the 2D image.

51. A computer-readable medium according to claim 40, wherein said user selected editing operation comprises the extension of a selected plane in the background of said 3D scene over the foreground of said 3D scene.

52. A computer-readable medium according to claim 40, wherein said user selected editing operation comprises the extension of a selected plane in the foreground of said 3D scene over the background of said 3D scene.

53. A computer-readable medium according to claim 40, wherein said user selected editing operation comprises the extension of a selected plane over objects in the foreground and the background of said 3D scene.

54. A computer-readable medium according to claim 40, wherein said step of receiving an input from the user, receives said input from a pointing device.

55. A computer-readable medium according to claim 54, wherein said designating step designates a swathe of pixels in the 2D image in response to a corresponding movement of said pointing device across a corresponding part of the displayed 2D image.

56. A computer-readable medium according to claim 55, wherein said user selected editing operation comprises the addition of semi-transparent paint to the 2D image, and wherein said modifying step inhibits the application of paint to pixels in the current swathe being painted which have already been painted during the painting of a previous swathe in the current editing session.

57. A computer-readable medium according to claim 40, further comprising process steps for storing said 2D image and said depth values in a mass storage device prior to the editing operation and process steps for storing said 2D image and said depth values in a working memory during said editing operation.

58. A computer-readable medium according to claim 57, further comprising process steps for storing the modified 2D image in said mass storage device after said editing operation.

59. A computer based interactive image editing apparatus comprising:
 a memory for storing (i) a two-dimensional (2D) image of a rendered three-dimensional (3D) scene viewed from a given viewpoint, the 2D image comprising an array of pixels which represents the appearance of said 3D scene from said viewpoint; and (ii) depth values for the pixels within the 2D image, which depth values represent the distance between said viewpoint and points in the 3D scene represented by the pixels;
 output circuitry for outputting said 2D image to a display for displaying the 2D image to a user;
 receiving circuitry for receiving an input from a user identifying an object within the 3D scene whose appearance within the 2D image is to be edited and identifying the desired editing operation to be performed;
 a designator, responsive to said user input, for designating pixels of the 2D image which are to be edited; and
 an image editor for modifying the designated pixels in dependence upon the user selected editing operation and upon the depth values associated with the designated pixels, so as to modify the appearance, within the 2D image, of the object represented by the designated pixels.

60. A computer-based interactive image editing apparatus comprising:
 a mass storage device for storing, prior to an image editing operation (i) at least one two-dimensional (2D) image of a rendered three-dimensional (3D) scene viewed from a given viewpoint, the 2D image comprising an array of pixels which represents the appearance of said 3D scene from said viewpoint; and (ii) respective depth values for the pixels within each 2D image, which depth values represent the distance between said viewpoint and points in the 3D scene represented by the pixels;
 a working memory for storing a 2D image and associated depth values during an image editing operation;
 loading circuitry for loading a 2D image and associated depth values from said mass storage device to said working memory;
 output circuitry for outputting said 2D image to a display for displaying the 2D image to a user;
 a designator, responsive to an input from a user, for designating pixels of the 2D image which are to be edited;
 an image editor for modifying the designated pixels in dependence upon a user selected editing operation and upon the depth values associates with the designated pixels to generate an edited 2D image; and
 storing circuitry for storing said edited 2D image and associated depth values in said mass storage device for further processing or for further editing operations.

61. A computer-based interactive image editing method comprising the steps of:
 storing, prior to an image editing operation, (i) at least one two-dimensional (2D) image of a rendered three-dimensional (3D) scene viewed from a given viewpoint, the 2D image comprising an array of pixels which represents the appearance of said 3D scene from said viewpoint; and (ii) respective depth values for the pixels within each 2D image, which depth values represent the distance between said viewpoint and points in the 3D scene represented by the pixels;
 loading said 2D image and the associated depth values into a working memory;
 displaying the 2D image to a user;
 designating, in response to an input from a user, pixels of the 2D image to be edited;
 modifying the designated pixels in dependence upon a user selected editing operation and upon the depth values associated with the designated pixels to generate an edited 2D image; and
 storing said edited 2D image and associated depth values in said mass storage device for further processing or further editing operations.

62. A computer-based interactive image editing apparatus comprising:
 a memory for storing (i) a two-dimensional (2D) image of a rendered three-dimensional (3D) scene viewed from a given viewpoint, the 2D image comprising an array of pixels which represents the appearance of said 3D scene from said viewpoint; and (ii) depth values for the pixels within the 2D image, which depth values represent the distance between said viewpoint and points in the 3D scene represented by the pixels;

output circuitry for outputting said 2D image to a display for displaying said 2D image to a user;

a designator, responsive to an input from a user, for designating part of the 2D image to be edited; and an image editor for modifying the designated part of the image;

wherein said designator is operable to designate said part of the 2D image in dependence upon said stored depth values.

63. A computer-based interactive image editing method comprising the steps of:

storing (i) a two-dimensional (2D) image of a rendered three-dimensional (3D) scene viewed from a given viewpoint, the 2D image comprising an array of pixels which represents the appearance of said 3D scene from said viewpoint; and (ii) depth values for the pixels within the 2D image, which depth values represent the distance between said viewpoint and points in the 3D scene represented by the pixels;

displaying the 2D image to a user;

receiving a first user input identifying an editing operation to be performed;

receiving a second user input identifying a part of the 2D image to be edited;

designating, in response to said second user input, pixels of the 2D image which are to be edited; and modifying the designated pixels using the user selected editing operation;

wherein said designating step designates said pixels to be edited in dependence upon said stored depth values.

64. A computer-based interactive image editing apparatus comprising:

a memory for storing a two-dimensional (2D) image comprising an array of pixels;

an output circuit for outputting said 2D image to a display for displaying the 2D image to a user;

means for defining a current editing session;

a designator for designating a swathe of pixels to be edited in response to a corresponding input by a user;

an image editor for applying a user selected semi-transparent paint to said designated swathe of pixels; and an inhibitor for inhibiting the application of paint to pixels in the current swathe being painted which have already been painted during the painting of a previous swathe in the current editing session.

65. A computer-based interactive image editing method comprising the steps of:

displaying a two-dimensional (2D) image comprising an array pixels;

defining a current editing session;

designating a swathe of pixels to be edited in response to a corresponding input by a user;

applying a user selected semi-transparent paint to the designated swathe of pixels; and inhibiting the application of paint to pixels in the current swathe being painted which have already been painted during the current editing session.

66. A computer-based interactive image editing apparatus comprising:

a memory for storing (i) a two-dimensional (2D) image comprising an array of pixels; and (ii) a 2D texture map comprising an array of pixels; and an image editor for editing said 2D image by applying the 2D texture map to the 2D image in dependence upon a tonality of the 2D image.

67. An apparatus according to claim 66, wherein said 2D texture map comprises a hatching texture and wherein in lighter parts of the 2D image, the thickness of the hatching lines applied is thinner than the thickness of the hatching lines in darker areas of the 2D image.

68. A computer-based interactive image editing method comprising the steps of:

storing a two-dimensional (2D) image comprising an array of pixels and a 2D texture map comprising an array of pixels; and editing said 2D image by applying the texture map to the 2D image in dependence upon a tonality of the 2D image.

69. A computer-based interactive image editing apparatus comprising:

means for storing (i) a two-dimensional (2D) image of a rendered three-dimensional (3D) scene viewed from a given viewpoint, the 2D image comprising an array of colour pixels which represents the appearance of said 3D scene from said viewpoint; and (ii) depth values for the pixels within the 2D image, which depth values represent the distance between said viewpoint and points in the 3D scene represented by the pixels;

output circuitry for outputting said 2D image to a display for displaying the 2D image to a user;

an applicator, responsive to an input from a user, for designating part of the 2D image to be edited;

an inhibitor for inhibiting the editing of some of the pixels in the designated part of the 2D image;

an image editor for editing the colour pixels within the designated part of the 2D image which are not inhibited from being edited, by blending an edited colour for each pixel with the existing colour of the pixel, to produce a new colour for the pixel; and wherein said inhibitor and/or said image editor is responsive to said stored depth values.

70. A computer-based interactive image editing apparatus comprising:

a memory for storing (i) a two-dimensional (2D) image of a rendered three-dimensional (3D) scene viewed from a given viewpoint, the 2D image comprising an array of pixels which represents the appearance of said 3D scene from said viewpoint; and (ii) material values for the pixels within the 3D image, which material values represent the material of an object in the 3D scene represented by those pixels;

output circuitry for outputting said 2D image to a display for displaying the 2D image to a user;

a designator, responsive to an input from a user; for designating pixels of the 2D image to be edited; and an image editor for modifying the designated pixels;

wherein said designator is operable to designate said pixels in dependence upon said stored material values.

71. A computer-based interactive image editing method comprising the steps of:

storing (i) a two-dimensional (2D) image of a rendered three-dimensional (3D) scene viewed from a given viewpoint, the 2D image comprising an array of pixels which represents the appearance of said 3D scene from said viewpoint; and (ii)material values for the pixels within the 2D image, which material values represent the material of an object in the 3D scene represented by those pixels;

displaying the 2D image to a user;

receiving a first user input identifying an editing effect to be applied to the 2D image;

receiving a second user input identifying a part of the 2D image to be edited;

designating, in response to said second user input, pixels of the 2D image which are to be edited; and modifying the designated pixels of the image using the user selected editing effect;

wherein said designating step designates said pixels in dependence upon the material values for the pixels in the image.

* * * * *